«12» United States Patent
Anchan et al.

(10) Patent No.: US 10,251,087 B2
(45) Date of Patent: Apr. 2, 2019

(54) IP FLOW MANAGEMENT FOR CAPACITY-LIMITED WIRELESS DEVICES

(71) Applicant: QUALCOMM Incorporated, San Diego, CA (US)

(72) Inventors: Kirankumar Bhoja Anchan, San Diego, CA (US); Srinivasan Balasubramanian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/687,899

(22) Filed: Aug. 28, 2017

(65) Prior Publication Data

US 2018/0063747 A1 Mar. 1, 2018

Related U.S. Application Data

(60) Provisional application No. 62/382,074, filed on Aug. 31, 2016.

(51) Int. Cl.
*H04L 12/66* (2006.01)
*H04W 28/06* (2009.01)
*H04W 28/22* (2009.01)
*H04W 28/24* (2009.01)
*H04L 12/26* (2006.01)
(Continued)

(52) U.S. Cl.
CPC ......... *H04W 28/06* (2013.01); *H04L 43/0876* (2013.01); *H04L 47/14* (2013.01); *H04L 47/26* (2013.01); *H04L 47/32* (2013.01); *H04L 65/1053* (2013.01); *H04L 65/80* (2013.01); *H04W 28/10* (2013.01); *H04W 28/22* (2013.01); *H04W 28/24* (2013.01); *H04W 72/0406* (2013.01); *H04L 43/16* (2013.01)

(58) Field of Classification Search
CPC ..... H04W 28/06; H04W 28/22; H04W 28/24; H04L 43/0876; H04L 43/16
See application file for complete search history.

(56) References Cited

U.S. PATENT DOCUMENTS 8,843,373 B1 * 9/2014 Allen ................. G10L 21/00
370/377
2008/0056273 A1 * 3/2008 Pelletier ............... H04L 69/04
370/395.21
(Continued)

OTHER PUBLICATIONS

ISA/EP, International Search Report and Written Opinion of the International Searching Authority, Int'l Application No. PCT/US2017/049480, dated Nov. 8, 2017, European Patent Office, Rijswijk, NL, 13 pgs.

*Primary Examiner* — Clemence S Han
(74) *Attorney, Agent, or Firm* — Holland & Hart LLP

(57) ABSTRACT

Capacity limited devices may initiate real-time Internet protocol (IP) flows that may include voice data for voice calls. Talk-over patterns may be identified, and an IP flow may be modified based at least in part on the identified talk-over pattern. Such a modification of an IP flow may include, for example, dropping one or more downlink or uplink packets of the IP flow, modifying a semi-persistent scheduling (SPS) grant to suppress one or more uplink transmissions, or modifying a reliability target associated with the IP flow to reduce a number of redundant transmissions or number of retransmissions.

29 Claims, 21 Drawing Sheets

(51) Int. Cl.
*H04L 29/06* (2006.01)
*H04W 28/10* (2009.01)
*H04W 72/04* (2009.01)
*H04L 12/801* (2013.01)
*H04L 12/825* (2013.01)
*H04L 12/823* (2013.01)

(56) References Cited

U.S. PATENT DOCUMENTS

| | | |
|---|---|---|
| 2009/0168673 A1* | 7/2009 | Kalampoukas ....... H04L 65/601 370/286 |
| 2011/0044168 A1 | 2/2011 | Nadas et al. |
| 2011/0282650 A1* | 11/2011 | Jennings ............... G10L 15/005 704/8 |
| 2015/0120293 A1* | 4/2015 | Wohlert ................ G10L 21/02 704/235 |
| 2015/0282148 A1 | 10/2015 | Le |

* cited by examiner

IP FLOW MANAGEMENT FOR CAPACITY-LIMITED WIRELESS DEVICES

CROSS REFERENCES

The present Application for Patent claims priority to U.S. Provisional Patent Application No. 62/382,074 by Anchan, et al., entitled "IP Flow Management For Capacity-Limited Wireless Devices," filed Aug. 31, 2016, assigned to the assignee hereof.

BACKGROUND

The following relates generally to wireless communication, and more specifically to Internet protocol (IP) flow management for capacity-limited wireless devices.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

Some types of wireless devices may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, alarm panels, control panels, wearable devices, weather and geological event monitoring, fleet management and tracking, remote security sensing, physical access control, and transaction-based business charging, to name a few non-exhaustive examples.

Some wireless communications systems may employ coverage enhancement (CE) techniques that increase system robustness. There may be different levels of coverage enhancement such that a higher level coverage enhancement provides more reliable communications, particularly for devices that are located relatively far away from a base station or in locations where wireless transmissions are relatively highly attenuated (e.g., in a basement location), relative to lower level coverage enhancements. In many cases, CE relies on repetition of transmissions, which may impact timelines for transmitting and processing certain types of communications.

SUMMARY

The described techniques relate to improved methods, systems, devices, or apparatuses that support IP flow management for capacity-limited wireless devices. Generally, the described techniques provide for enhanced communications of capacity limited devices during voice calls that may otherwise be unlikely to meet timelines for voice call transmissions. In some cases, talk-over patterns may be identified, and data flow (e.g., an internet protocol (IP) flow), between two devices may be modified based at least in part on the identified talk-over pattern. Such a modification of a data flow may include, for example, dropping one or more downlink or uplink packets of the data flow, modifying a semi-persistent scheduling (SPS) grant to suppress one or more uplink transmissions, or modifying a reliability target associated with the data flow (e.g., by modifying a coverage enhancement level of a user equipment (UE)).

A method of wireless communication is described. The method may include identifying, at a base station, a data flow, such as an IP flow, containing real-time voice data to be transmitted to a UE, identifying a talk-over pattern within the data flow, and modifying the data flow based at least in part on the identified talk-over pattern within the data flow.

An apparatus for wireless communication is described. The apparatus may include means for identifying, at a base station, a data flow, such as an IP flow, containing real-time voice data to be transmitted to a UE, means for identifying a talk-over pattern within the Data flow, and means for modifying the Data flow based at least in part on the identified talk-over pattern within the Data flow.

Another apparatus for wireless communication is described. The apparatus may include a processor, memory in electronic communication with the processor, and instructions stored in the memory. The instructions may be operable to cause the processor to identify, at a base station, a data flow, such as an IP flow, containing real-time voice data to be transmitted to a UE, identify a talk-over pattern within the data flow, and modify the data flow based at least in part on the identified talk-over pattern within the data flow.

A non-transitory computer readable medium for wireless communication is described. The non-transitory computer-readable medium may include instructions operable to cause a processor to identify, at a base station, a data flow, such as an IP flow, containing real-time voice data to be transmitted to a UE, identify a talk-over pattern within the data flow, and modify the data flow based at least in part on the identified talk-over pattern within the data flow.

In some examples of the method, apparatus, and non-transitory computer-readable medium described above, the modifying the data flow comprises dropping one or more downlink packets to be transmitted to the UE. In some examples of the method, apparatus, and non-transitory computer-readable medium described above, the modifying the data flow comprises terminating a SPS grant to the UE to suppress one or more uplink packets to be transmitted from the UE. In some examples of the method, apparatus, and non-transitory computer-readable medium described above, the modifying the data flow further comprises signaling, after one or more downlink transmissions to the UE, a resumed SPS grant to the UE. In some examples of the method, apparatus, and non-transitory computer-readable medium described above, the modifying the data flow comprises modifying a reliability target for one or more packets to be transmitted in the data flow. In some examples of the method, apparatus, and non-transitory computer-readable medium described above, the reliability target indicates one or more of a repetition rate for the one or more packets or a quantity of retransmissions associated with the one or more packets.

In some examples of the method, apparatus, and non-transitory computer-readable medium described above, the identifying the talk-over pattern within the data flow comprises identifying a real-time transport protocol (RTP) IP flow associated with the UE, determining that voice data may be included in both uplink packets transmitted from the UE and downlink packets to be transmitted to the UE, and determining that the voice data exceeds a link capacity of the UE. In some examples of the method, apparatus, and non-transitory computer-readable medium described above, the modifying the data flow comprises dropping a downlink packet or a set of bundled RTP packets that may be scheduled in one set of transmissions to the UE.

In some examples of the method, apparatus, and non-transitory computer-readable medium described above, the determining that voice data may be included in both uplink packets transmitted from the UE and downlink packets to be transmitted to the UE comprises identifying the voice data based at least in part on one or more of a packet size of one or more packets of the RTP IP flow, a quality-of-service class identifier (QCI) of the RTP IP flow, an access point name (APN), an IP address, or an IP subnet associated with the RTP IP flow. In some examples of the method, apparatus, and non-transitory computer-readable medium described above, the determining that voice data may be included in both uplink packets transmitted from the UE and downlink packets to be transmitted to the UE comprises identifying separate differentiated services code point (DSCP) values associated with the RTP IP flow. In some examples of the method, apparatus, and non-transitory computer-readable medium described above, the determining that voice data may be included in both uplink packets transmitted from the UE and downlink packets to be transmitted to the UE comprises performing a deep packet inspection (DPI) of the uplink packets and the downlink packets. In some examples of the method, apparatus, and non-transitory computer-readable medium described above, the determining that voice data may be included in both uplink packets transmitted from the UE and downlink packets to be transmitted to the UE comprises determining that a frequency of the uplink packets and downlink packets exceeds a silence indicator description (SID) packet frequency.

In some examples of the method, apparatus, and non-transitory computer-readable medium described above, the determining that the voice data exceeds the link capacity of the UE comprises determining that a queue size associate with the RTP IP flow exceeds a threshold value. In some examples of the method, apparatus, and non-transitory computer-readable medium described above, the modifying the data flow comprises identifying one or more packets to be dropped from the data flow, and dropping the one or more identified packets from the data flow. In some examples of the method, apparatus, and non-transitory computer-readable medium described above, the identifying one or more packets to be dropped from the data flow may be based at least in part on one or more of: a random selection of packets within the data flow, a first packet in a queue associated with the data flow that may be to be delivered to the UE, a DSCP value of packets within the data flow, or a packet size of packets within the data flow.

In some examples of the method, apparatus, and non-transitory computer-readable medium described above, the modifying the data flow comprises determining whether to drop one or more uplink or downlink packets from the data flow, dropping one or more downlink packets and an associated downlink transmission to the UE when one or more downlink packets are to be dropped, and terminating a SPS grant to the UE when one or more uplink packets may be to be dropped. In some examples of the method, apparatus, and non-transitory computer-readable medium described above, the modifying the data flow further comprises identifying that the talk-over pattern within the data flow satisfies a threshold, and reinstating a SPS grant to the UE based on the identifying.

In some examples of the method, apparatus, and non-transitory computer-readable medium described above, the determining whether to drop the one or more uplink or downlink packets from the data flow may be based at least in part on one or more of: an amount of uplink data to be transmitted by the UE, a number of downlink packets queued to be transmitted to the UE, or a repetition level associated with the uplink data.

Another method of wireless communication is described. The method may include identifying, at a UE, a data flow containing real-time voice data to be transmitted to a base station, identifying a talk-over pattern within the data flow, and modifying the data flow based at least in part on the identified talk-over pattern within the data flow.

An apparatus for wireless communication is described. The apparatus may include means for identifying, at a UE, a data flow containing real-time voice data to be transmitted to a base station, means for identifying a talk-over pattern within the data flow, and means for modifying the data flow based at least in part on the identified talk-over pattern within the data flow.

Another apparatus for wireless communication is described. The apparatus may include a processor, memory in electronic communication with the processor, and instructions stored in the memory. The instructions may be operable to cause the processor to identify, at a UE, a data flow containing real-time voice data to be transmitted to a base station, identify a talk-over pattern within the data flow, and modify the data flow based at least in part on the identified talk-over pattern within the data flow.

A non-transitory computer readable medium for wireless communication is described. The non-transitory computer-readable medium may include instructions operable to cause a processor to identify, at a UE, a data flow containing real-time voice data to be transmitted to a base station, identify a talk-over pattern within the data flow, and modify the data flow based at least in part on the identified talk-over pattern within the data flow.

In some examples of the method, apparatus, and non-transitory computer-readable medium described above, the modifying the data flow comprises dropping one or more uplink packets from the data flow based at least in part on the identified talk-over pattern within the data flow. In some examples of the method, apparatus, and non-transitory computer-readable medium described above, the modifying the data flow comprises modifying a reliability target for one or more packets to be transmitted in the data flow. In some examples of the method, apparatus, and non-transitory computer-readable medium described above, the reliability target indicates one or more of a repetition rate for the one or more packets or a quantity of retransmissions associated with the one or more packets. In some examples of the method, apparatus, and non-transitory computer-readable medium described above, the modifying the data flow further comprises identifying that the talk-over pattern within the data flow satisfies a threshold, and transmitting to the base station, a request to reinstate a SPS grant.

In some examples of the method, apparatus, and non-transitory computer-readable medium described above, the identifying the talk-over pattern within the data flow comprises determining that the data flow includes voice data in both uplink packets to be transmitted from the UE and in downlink packets being received at the UE, and determining that the voice data exceeds a link capacity of the UE.

In some examples of the method, apparatus, and non-transitory computer-readable medium described above, the determining that the data flow includes voice data in both uplink packets and downlink packets comprises identifying the voice data based at least in part on one or more of a packet size of one or more of packets of the data flow, a QCI of the data flow, an APN, an IP address, or an IP subnet associated with the data flow. In some examples of the method, apparatus, and non-transitory computer-readable medium described above, the determining that the data flow includes voice data in both uplink packets and downlink packets comprises identifying separate DSCP values associated with the data flow. In some examples of the method, apparatus, and non-transitory computer-readable medium described above, the determining that the data flow includes voice data in both uplink packets and downlink packets comprises performing a DPI of the uplink packets and the downlink packets. In some examples of the method, apparatus, and non-transitory computer-readable medium described above, the determining that the data flow includes voice data in both uplink packets and downlink packets comprises determining that a frequency of the downlink packets exceeds a SID packet frequency.

In some examples of the method, apparatus, and non-transitory computer-readable medium described above, the determining that the voice data exceeds the link capacity of the UE comprises determining that a queue size associate with the data flow exceeds a threshold value. In some examples of the method, apparatus, and non-transitory computer-readable medium described above, the determining that the voice data exceeds the link capacity of the UE comprises determining that a SPS grant to the UE has been terminated while the UE still may have voice data to be transmitted. In some examples of the method, apparatus, and non-transitory computer-readable medium described above, the modifying the data flow further comprises discontinuing the modifying based at least in part on determining, after one or more downlink transmissions to the UE, that the SPS grant to the UE may be reinstated.

In some examples of the method, apparatus, and non-transitory computer-readable medium described above, the dropping the one or more uplink packets from the data flow comprises identifying one or more packets to be dropped from the data flow, and dropping the one or more identified packets from the data flow. In some examples of the method, apparatus, and non-transitory computer-readable medium described above, the identifying one or more packets to be dropped from the data flow may be based at least in part on one or more of: a random selection of packets within the data flow, a first packet in a queue associated with the data flow that may be to be delivered to the UE, a DSCP value of packets within the data flow, or a packet size of packets within the data flow.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
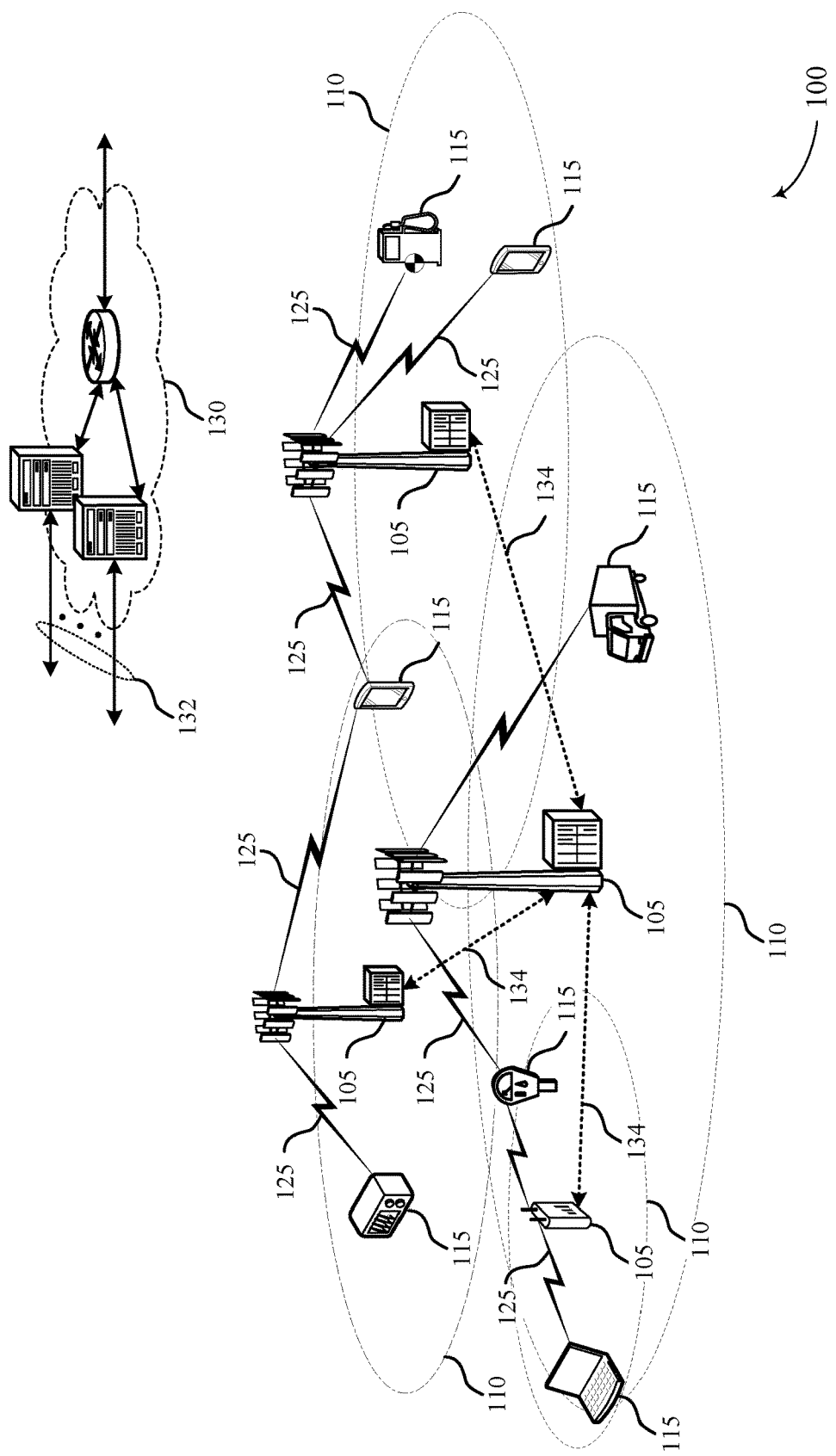
FIG. 1 illustrates an example of a system for wireless communication that supports IP flow management for capacity-limited wireless devices in accordance with aspects of the present disclosure.

Real-time communications with a wireless device may require that certain communications be completed within certain time periods, in order to prevent large gaps in the communication or a diminished user experience. For example, a real-time voice communication may generate voice packets every 20 ms, and if it consistently takes longer than an average of 20 ms to transmit the voice packets, delays may accumulate and result in a connection that may not be maintained. In deployments that use coverage enhancement (CE) techniques for certain transmissions that rely on repetitions of data, consistently meeting average time constraints may be difficult. In particular, meeting timelines associated with real-time transport protocol (RTP) Internet protocol (IP) flows, such as may be used for voice-over-LTE (VoLTE) calls, may be difficult for such devices. In some cases, for example, a device may be configured to operate in a half-duplex CE mode that assumes only one talker. In the event that both ends talk simultaneously, which may be referred to as talk-over, the link capacity may be overwhelmed, resulting in scheduling delays and congestion, which may negatively impact voice quality.

The present disclosure provides various techniques for supporting real-time communications for devices that may be bandwidth limited, that may be power limited, or that may rely on one or more CE techniques for reliable communications. Various described techniques provide for enhanced communications of capacity limited devices during voice calls that may otherwise be unlikely to meet RTP IP flow timelines for voice call transmissions. In some cases, talk-over patterns may be identified, and a data flow between two devices modified based at least in part on the identified talk-over pattern. In some cases, an IP flow may be an example of the data flow. Such a modification of the IP flow may include, for example, dropping one or more downlink or uplink packets of the IP flow, modifying a SPS grant to suppress one or more uplink transmissions, or modifying a reliability target associated with the IP flow (e.g., by modifying a coverage enhancement level of a UE).

As mentioned above, some types of wireless devices may provide for Machine-to-Machine (M2M) communication or Machine Type Communication (MTC). M2M or MTC may refer to data communication technologies that allow devices to communicate with one another, or a base station, without human intervention. For example, M2M or MTC may refer to communications from devices that integrate sensors or meters to measure or capture information and relay that information to a central server or application program that can make use of the information or present the information to humans interacting with the program or application. MTC devices are commonly implemented in LTE networks under a relatively new category of device, referred to as a CAT-M1 device, compared with traditional devices referred to as CAT-1 devices. CAT-M1 devices may have a reduced peak data rate relative to CAT-1 devices, may use a single receive antenna, operate using half duplex frequency division duplexing (FDD) and transmit using a reduced bandwidth of 1.4 MHz relative to a 20 MHz bandwidth of CAT-1 devices. CAT-M1 devices may use a MTC Physical Downlink Control Channel (MPDCCH) for certain downlink control transmissions.

Such CAT-M1 devices may also support deployment in locations with relatively poor channel conditions and may have UEs in a power class of 20 dBM with existing 23 dBM power class devices. Coverage enhancements may be selected that provide medium coverage enhancement (mode A CE support), or that provide large coverage enhancement (mode B CE support). Additionally, CAT-1 devices may optionally support one or more modes of coverage enhancement.

While various examples describe CAT-M1 devices as MTC or M2M devices, such devices may also include other types of UEs, such as narrowband wearable devices, alarm panels, display kiosks, and the like. Additionally, in some cases it may be desirable that such UEs support real-time communications, such as voice communications, in addition to MTC communications. Such real-time communications may include, for example, voice over LTE (VoLTE) or voice over internet protocol (VoIP). Such real-time services may also include services other than voice services, such as real-time monitoring, exchange of navigation data, or tracking data services, for example. Additionally, other types of UEs, such as CAT-1 UEs, may employ techniques described herein in certain situations, such as in power limited situations or when such a UE is trying to conserve battery power due to a low battery level.

As indicated above, in some cases when certain CE techniques are employed it may be difficult to support real-time communication such as VoLTE on bandwidth restricted devices (e.g. a UE with a LTE CAT M1 modem). For example, a CAT-M1 based UE operating in a CE mode may use packet repetition to meet a link budget. For example, to gain a service footprint comparable to a CAT-1 UE, an uplink repetition pattern of 32 or higher may be suitable to achieve a comparable link budget for a CAT-M1 UE power class. Such CE techniques may present difficulty to support certain real-time services due to, for example, timing requirements for the real-time service. For example, in a real-time VoLTE or VoIP service, voice packets may be generated every 20 ms. Packet repetitions, along with other constraints associated with bandwidth restricted devices such as half-duplex operation, in which time may be allotted for re-tuning between uplink/downlink transmissions, may result in scheduling delays for the real-time data packets.

Additionally, there may be minimum scheduling time constraints between resource allocation grants and scheduling of data transmissions, such as a minimum scheduling time between a MPDCCH grant assigned to a UE and scheduling of data on PDSCH or PUSCH for the UE. Furthermore, in addition to real-time data frames, certain frames may come from the other direction for the real-time IP flow. For example, in a voice IP flow, voice frames may be transmitted in one direction and silence frames may be transmitted from another direction. Furthermore, real-time transport control protocol (RTCP) data and in-call signaling may further impact the delays. With the current scheduling techniques it may be likely that the scheduling will not meet the real-time data service timelines. For example, per the International Telecommunication Union (ITU) G.114 recommendation, for good audio experience, an end to end delay of less than 400 ms should be maintained. Current LTE networks with CAT 1 VoLTE devices are under and close to this 400 ms end to end delay mark, without leaving much scheduling time for CAT-M1 repetition based scheduling for certain CE modes.

Various aspects of the disclosure provide techniques for reducing certain transmissions for such device, thereby alleviating some scheduling constraints and providing an enhanced likelihood that a device can comply with identified timelines. Furthermore, in addition to timing considerations, reducing certain transmissions may reduce power consumption at a device, and may allow a power limited device to operate with reduced power. Additionally, in some cases, during a VoLTE or VoIP call, if two ends of the call talk simultaneously, since the underlying channel may be half duplex or bandwidth constrained, a channel might face resource starvation as a result of the control signaling and repetition overhead associated with concurrent talk frames. This may result in delayed packet delivery that propagates through the subsequent packet frame delivery, and may negatively impact performance of a system. In some examples, techniques are provided for dropping certain frames associated with simultaneous talking.

Aspects of the disclosure are initially described in the context of a wireless communications system. Aspects of the disclosure are further illustrated by and described with reference to apparatus diagrams, system diagrams, and flowcharts that relate to voice activity based half-duplex calling.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network. Base stations 105 and UEs 115 may, in some examples, provide for enhanced communications of a capacity limited UE 115 during voice calls, through identification of talk-over patterns and modification of an IP flow based at least in part on the identified talk-over pattern. Such a modification of an IP flow may include, for example, dropping one or more downlink or uplink packets of the IP flow, modifying a SPS grant to suppress one or more uplink transmissions, or modifying a reliability target associated with the IP flow (e.g., by modifying a coverage enhancement level of a UE 115).

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or, DL transmissions from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like. A UE 115 may be a device that includes a CAT-1 or CAT-M1 modem, in some examples.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

As indicated above, some types of wireless devices may provide for automated communication. Automated wireless devices may include those implementing Machine-to-Machine (M2M) communication or machine type communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

In certain examples, CAT-M1 devices may have reduced peak data rates (e.g., a maximum transport block size may be 1000 bits). Additionally, such a device may have rank one transmission and one antenna for receiving. This may limit a CAT-M1 UE 115 to half-duplex communication (i.e., the device may not be capable of simultaneously transmitting and receiving). If a UE 115 is half-duplex, it may have relaxed switching time (e.g., from transmission (Tx) to reception (Rx) or vice versa). For example, a nominal switching time for a CAT-1 device may be 20 µs while a switching time for a CAT-M1 device may be 1 ms. MTC enhancements (eMTC) in a wireless system may allow narrowband MTC devices to effectively operate within wider system bandwidth operations (e.g., 1.4/3/5/10/15/20 MHz). For example, an MTC UE 115 may support 1.4 MHz bandwidth (i.e., 6 resource blocks in an LTE system), and may support a frequency hopping pattern within a 20 MHz bandwidth. In some instances, as discussed above, CE may be employed to provide more reliable communications. Coverage enhancements may include, for example, power boosting (e.g., of up to 15 dB), beam-forming, and bundling of transmit time intervals (TTIs) to provide multiple redundant versions of a transmission.

Wireless communications system 100 may, for example, employ TTI bundling to improve a communication link 125 in relatively poor radio conditions or in deployments where UEs 115 may operate using a relatively narrow bandwidth or are in a coverage limited location, such as a basement or at a cell edge. TTI bundling may involve sending multiple redundant copies of the same information in a group of consecutive or non-consecutive TTIs rather than waiting for feedback indicating data was not received before retransmitting redundancy versions. For instance, various physical channels—including the physical broadcast channel (PBCH) and associated messages—may be associated with multiple redundant transmissions to a wireless communications device. In some cases, the number of redundant versions can be on the order of tens of subframes, and different channels may have different redundancy levels.

In some cases LTE networks may be designed for transfer of data packets, and may use a circuit switched fall back for voice communications. However, an LTE network may also be used for voice communications using a packet based system similar to various VoIP applications (e.g., Skype). This may be accomplished using VoLTE technology. There may be several differences between VoLTE and VoIP. For example, VoLTE service may include an explicit QoS target. To achieve the QoS threshold in poor radio conditions, VoLTE packets may utilize IMS and other network features to ensure low latency and improved error correction. In cases where a UE 115 is operating using one or more CE techniques, timelines for voice communications may be difficult to achieve. In various examples, talk-over at each end of a VoLTE call may be identified and an associated UL flow modified to reduce transmissions of certain talk-over data, which may help to achieve required VoLTE timelines and link budget requirements for certain bandwidth limited, power limited, half duplex FDD UEs 115.

Figure 2:
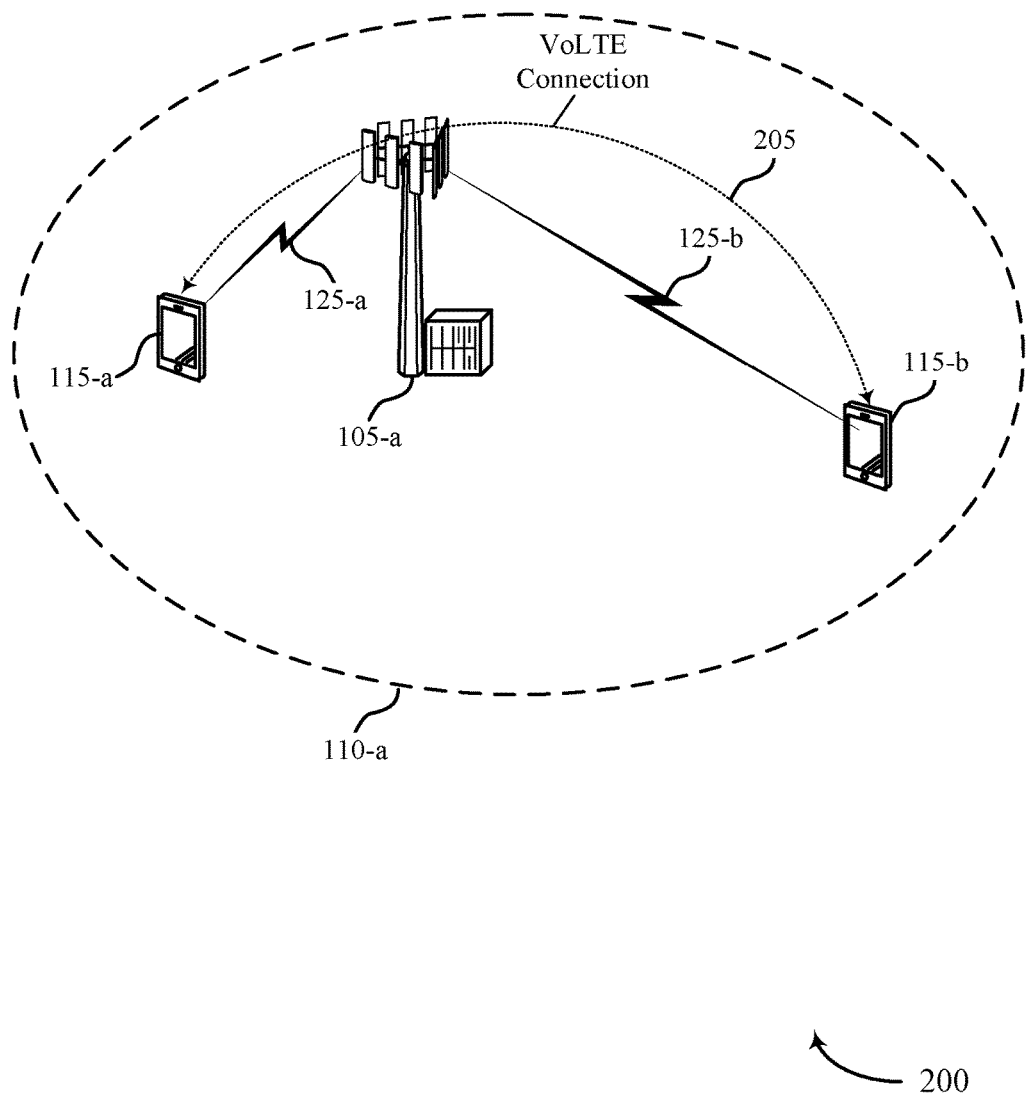
FIG. 2 illustrates an example of a wireless communications system that supports IP flow management for capacity-limited wireless devices in accordance with aspects of the present disclosure.

FIG. 2 illustrates an example of a wireless communications system 200 for IP flow management for capacity-limited wireless devices, in accordance with various aspects of the present disclosure. Wireless communications system 200 may include a first UE 115-a and a second UE 115-b, which may be examples of a UE 115 described with reference to FIG. 1. For example, as illustrated, one or more of the first UE 115-a or second UE 115-b may be bandwidth restricted or power restricted, or may be operating using one or more CE techniques. Wireless communications system 200 may also include a base station 105-a, which may be an example of a base station 105 described above with reference to FIG. 1. The base station 105-a may transmit control and data to any UE 115 within its geographic coverage area 110-a via a communication links 125. For example, communication link 125-a may allow for bidirectional communication between the first UE 115-a and the base station 105-a, and communication link 125-b may allow for bidirectional communication between the second UE 115-b and the base station 105-a. In some examples, a real-time connection may be established between the first UE 115-a and the second UE 115-b, such as a VoLTE connection 205.

The VoLTE connection 205 may be established through a data flow, such as an IP flow, that may include voice packets and other packets such as one or more of a silence indicator description (SID) packet, or real-time transport control protocol (RTCP) data. In some examples, the voice communication may be negotiated as a full duplex or half duplex VoIP or VoLTE call. Timelines for real-time data communications may be achieved, in some examples, by modifying an IP flow in the event of talk-over at each of the UEs 115, such as by dropping one or more uplink or downlink packets, or modifying a CE level of a transmission. For example, the first UE 115-a may be bandwidth restricted or power limited (e.g., a CAT-M1 UE or a CAT-1 UE that is power limited). The first UE 115-a may establish VoLTE connection 205 with second UE 115-b via base station 105-a, and one or more of the base station 105-a or UEs 115 may use one or more techniques to modify the IP flow for the VoLTE connection 205 based on identification of a talk-over pattern. While various examples described herein reference talk-over, techniques described herein may be used in any situation where congestion in a link is sensed such that link capacity of a connection is becoming overwhelmed (e.g., when other non-VoLTE data is being transmitted, when channel conditions require multiple retransmissions of data, etc.).

In some examples, base station 105-a may pre-emptively drop one or more downlink packets to be transmitted to UE 115-a when talk over or congestion is sensed. In such cases, when the base station 105-a detects a talk-over situation that will result in congestion, the base station 105-a may pre-emptively drop a RTP packet or a set of bundled RTP packets that is scheduled in one set of downlink transmissions. By dropping such a downlink packet or set of bundled RTP packets, the base station 105-a may allow the UE 115-a to initiate an uplink transmission more quickly, which may allow timelines for the IP flow to be maintained. In some examples, the base station 105-a may pre-emptively terminate a semi-persistent scheduling (SPS) grant to the UE 115-a when talk-over is detected, and resume the SPS grant when talk-over is no longer detected. Such a termination of an SPS grant may suppress associated uplink transmissions from the UE 115-a, and enable timely completion of the downlink transmissions within RTP timelines for the IP flow. The UE 115-a may, based on the SPS grant termination, discard an uplink RTP frame for the instance. After the base station 105-a has scheduled the subsequent downlink transmission after the uplink SPS interruption, the base station may resume SPS by providing a new SPS grant to the UE 115-a, and the UE 115-a may start uplink transmissions again. In some other cases, the base station 105-a may receive a request, from the UE 115-a, to reinstate a SPS grant, following which the base station 105-a may decide to resume SPS grants.

In some examples, the base station 105-a may select whether to drop a downlink transmission or suspend SPS at the UE 115-a based at least in part on the potential timing gains associated with each transmission and an amount of data to be transmitted in a particular direction. For example, if the uplink transmissions require more repetition, then uplink may be prioritized for throttling. In other examples, the base station 105-a may modify a CE level of the UE 115-a, in order to provide completion of uplink or downlink transmissions more quickly.

In some examples, the UE 115-a may pre-emptively drop one or more packets on the uplink when talk-over is sensed. In such cases, when the UE 115-a senses that there is a talk-over situation that will result in congestion, the UE 115-a may pre-emptive drop a RTP packet or a set of bundled RTP packets scheduled in one set of transmissions. The UE 115-a may then resume uplink transmissions following one or more dropped transmissions when the associated timelines for the IP flow are expected to be met.

The determination of talk-over, or the onset of congestion, may be detected by the base station 105-a or UE 115-a based on parameters associated with the IP flow. For example, the determination of talk-over may be based at least in part on packet sizes in both directions on the RTP IP flow, a quality-of-service class identifier (QCI) of the RTP IP flow, an access point name (APN), an IP address, or an IP subnet associated with the RTP IP flow. In some cases, the determination of talk-over may be based at least in part on one or more of: a separate differentiated services code point (DSCP) values associated with the RTP IP flow; a deep packet inspection (DPI) based detection of RTP speech; the presence of packets in both directions having a frequency that is greater than a frequency of delivery of a silence indicator description (SID) packets, indicating a genuine talk-over and not silence; or a build-up of a data queue associated with the RTP flow. In some cases, the UE 115-*a*, the base station 105-*a*, or both, may identify that the talk-over or congestion has fallen below a threshold, based at least in part on analyzing the one or more of the parameters associated with the IP flow. In such cases, the base station 105-*a* may resume or reinstate SPS grants based at least in part on the identifying.

In cases where one or more packets are dropped, the packets to be dropped may be identified based on, for example, a random selection, a first packet in a queue to be delivered, a packet that is identified by a special DSCP, or a packet having a packet size that is larger than other packets or that exceeds a threshold value. In such a manner, timelines associated with the RTP IP flow may be maintained with relatively little impact on the quality of the call.

Figure 3:
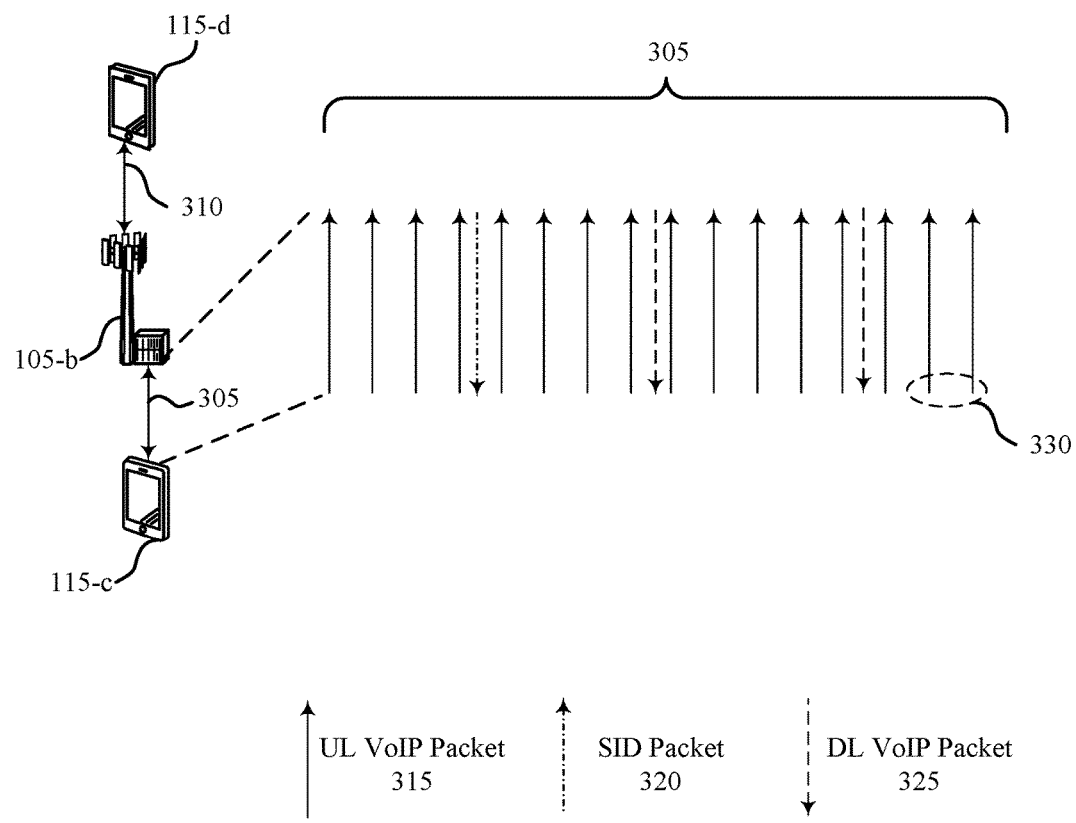
FIG. 3 illustrates an example of uplink and downlink communications that supports IP flow management for capacity-limited wireless devices in accordance with aspects of the present disclosure.

FIG. 3 illustrates an example of uplink and downlink communications 300 in which talk-over voice data may be transmitted. The uplink and downlink communications 300 may utilize half-duplex calling techniques employed within the systems 100 or 200 of FIG. 1 or 2. In this example, a first UE 115-*c* may have bidirectional communications 305 with base station 105-*b*. Similarly, a second UE 115-*d* may have bidirectional communications 310 with base station 105-*b*. Communications 305 may include uplink voice packets 315, downlink SID packets 320, and downlink voice packets 325. Additionally, two or more uplink voice packets 330 may be bundled in one MAC packet. The first UE 115-*c*, second UE 115-*d*, and base station 105-*b*, may be examples of a UE 115 and base station 105 of FIG. 1 or 2. One or both UEs 115 may be capacity-limited due to bandwidth restrictions, power restrictions, CE levels, or combinations thereof, which may impact real-time IP flow timelines or available power for transmissions. As indicated above, in the event that talk-over occurs in a VoLTE call with a capacity-limited UE, timelines for voice communications may be negatively impacted.

Various models for real-time communications may have assumptions on the amounts of types of traffic that may be present. For example, in a voice call, it may be assumed that 40% of the time a UE 115 will have talk data and will transmit voice packets 315, 40% of the time the UE 115 will receive listen data and will receive voice packets 315, and 20% of the time there will be silence, which may be indicated in SID packets 320. While the example of FIG. 3 shows more voice packets 315 in uplink transmissions, it will be readily understood that the same techniques may be applied in the event that more voice packets are present on downlink packets. Further, the same techniques may also apply to both uplink and downlink communications for the second UE 115-*d*.

During talk periods at the first UE 115-*c*, a VoIP packet 315 may be generated every 20 ms. The size of the VoIP packet 315 may depend on a vocoder used at the device. For example, for an AMR12.2 Vocoder, the packet size is 31 bytes. Furthermore, during a listen state, a UE 115 may generate SID packets 320 every 160 ms, and thus, during a talk state a SID packet 320 may be received every 160 ms. In the event that an additional downlink voice packet 325 is received before the next expected SID packet 320, it may be determined that a talk-over pattern is present. In some examples a UE 115 or base station 105 may identify the talk-over pattern, and modify the IP flow if time constraints for the IP flow may not be achieved. For example, base station 105-*b* may drop one or more downlink voice packets 325, or may suspend a SPS to UE 115-*c* to suppress transmission of an uplink voice packet 315. Further, as indicated above, a CE level of one or more of the uplink voice packets 315 or downlink voice packets 325 may be modified (e.g., by reducing a number or redundant transmissions of the packet) to achieve IP flow timelines. Combinations of such techniques may be used as well.

Figure 4:
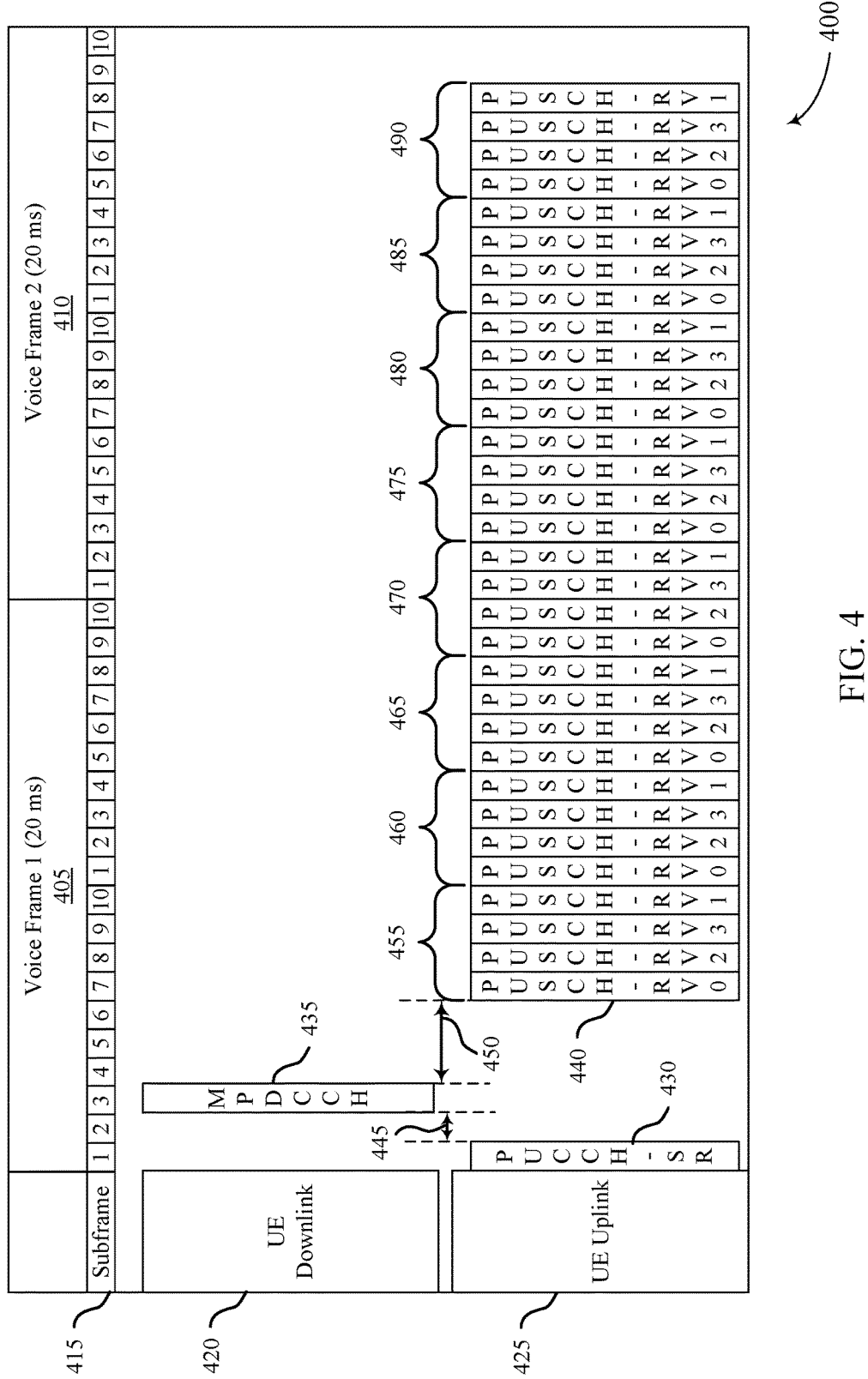
FIG. 4 illustrates an example of an uplink time delay budget that supports IP flow management for capacity-limited wireless devices in accordance with aspects of the present disclosure.

FIG. 4 illustrates an example of a time delay budget 400 for IP flow management for capacity-limited wireless devices for uplink talk frames. The time delay budget 400 in this example may utilize a first CE level employed within the systems 100 or 200 of FIG. 1 or 2. In this example, a first 20 ms voice frame 405 and a second 20 ms voice frame 410 are illustrated. In some examples, as discussed above, voice packets are generated for each 20 ms voice frame 405-410. In certain examples, voice packets from the first voice frame 405 and the second voice frame 410 may have a transport block size (TBS) of 408 bytes, and may be bundled into a single MAC packet that may be transmitted according to a set CE level.

Data may be transmitted in subframes 415 associated with each voice frame 405-410 as its expected transmission completion time to meet the VoIP timelines, which may include half-duplex UE downlink transmissions 420 and UE uplink transmissions 425. In this example, the UE (e.g., a UE 115 of FIGS. 1-3) may bundle voice packets from two voice frames and transmit a scheduling request (SR) in a PUCCH transmission 430. After a first tuning gap 445, the UE may receive an MPDCCH transmission 435 that may include an allocation for uplink resources to transmit the voice data. After a second tuning gap 450, PUSCH transmissions 440 may be transmitted. In this example, the CE level provides for 32 repetitions of the PUSCH data, which may be performed through four redundancy versions (RV) of the data that may be repeated eight times as PUSCH transmissions 455-490. In this example, the PUSCH transmissions are completed by the end of the second voice frame 410, and thus timelines for the IP flow are met.

Figure 5:
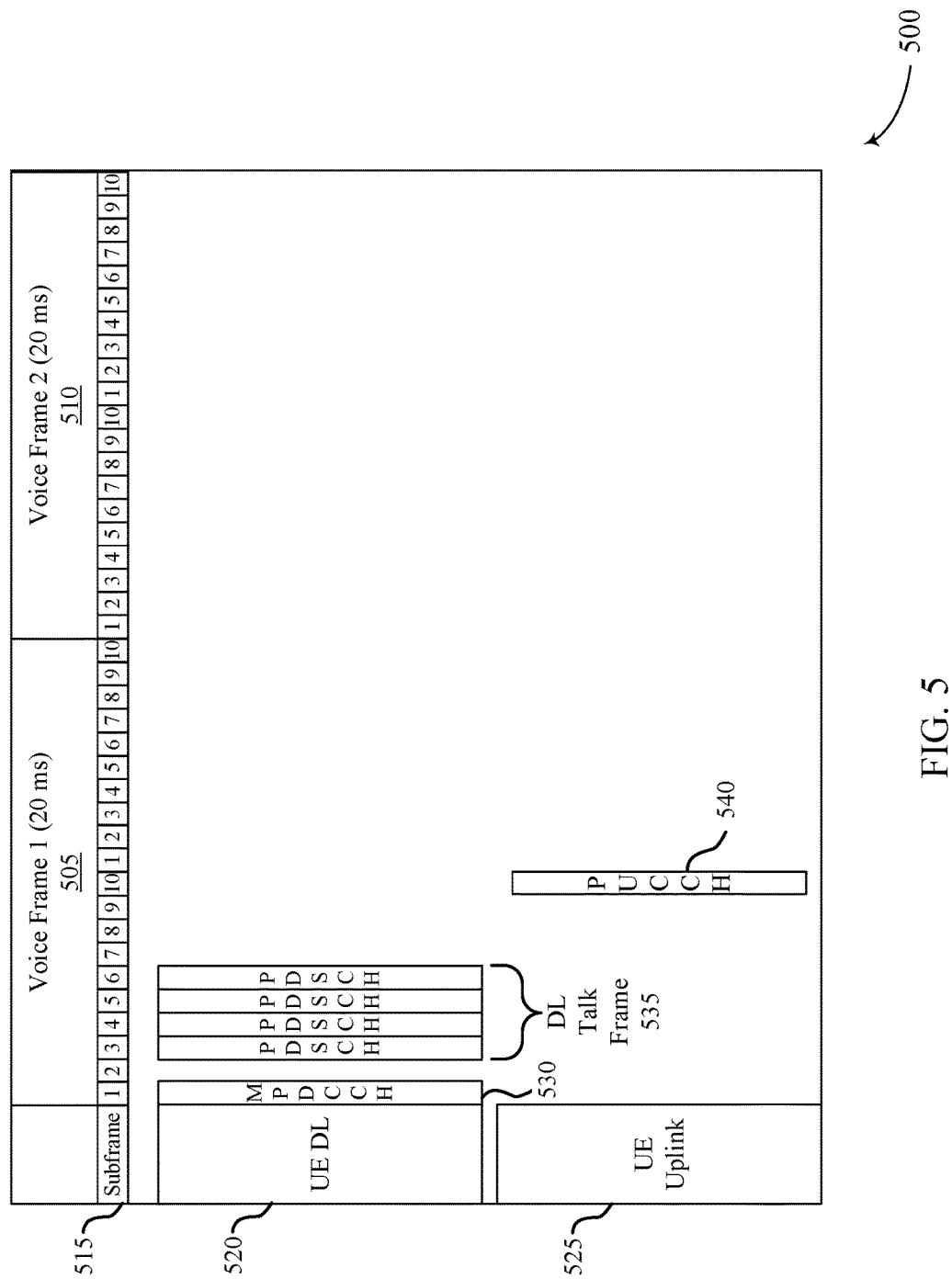
FIG. 5 illustrates an example of a downlink talk frame time delay budget that supports IP flow management for capacity-limited wireless devices in accordance with aspects of the present disclosure.

FIG. 5 illustrates an example of a time delay budget 500 for IP flow management for capacity-limited wireless devices for downlink talk frames. The time delay budget 500 in this example may utilize a second CE level employed within the systems 100 or 200 of FIG. 1 or 2 for downlink transmissions, which may provide a repetition level of four and a TBS of 408 bytes. In this example, a first 20 ms voice frame 505 and a second 20 ms voice frame 510 are illustrated. In some examples, as discussed above, voice packets are generated for each 20 ms voice frame 505-410. In certain examples, voice packets from the first voice frame 505 and the second voice frame 510 may be bundled into a single MAC packet that may be transmitted according to a set CE level.

Data may be transmitted in subframes 515 associated with each voice frame 505-410 as its expected transmission completion time to meet the VoIP timelines, which may include half-duplex UE downlink transmissions 520 and UE uplink transmissions 525. In this example, the base station (e.g., a base station 105 of FIGS. 1-3) may bundle voice packets from two voice frames and transmit a downlink grant in a MPDCCH transmission 530. After a tuning gap, the UE may receive a bundled PDSCH downlink talk frame 535. After a second tuning gap, the UE may transmit a PUCCH transmissions 540. In this example, the CE level provides for 4 repetitions of the PDSCH data. In this example, the PDSCH transmissions are completed by the end of the first voice frame 505, and thus timelines for the IP flow are met.

Figure 6:
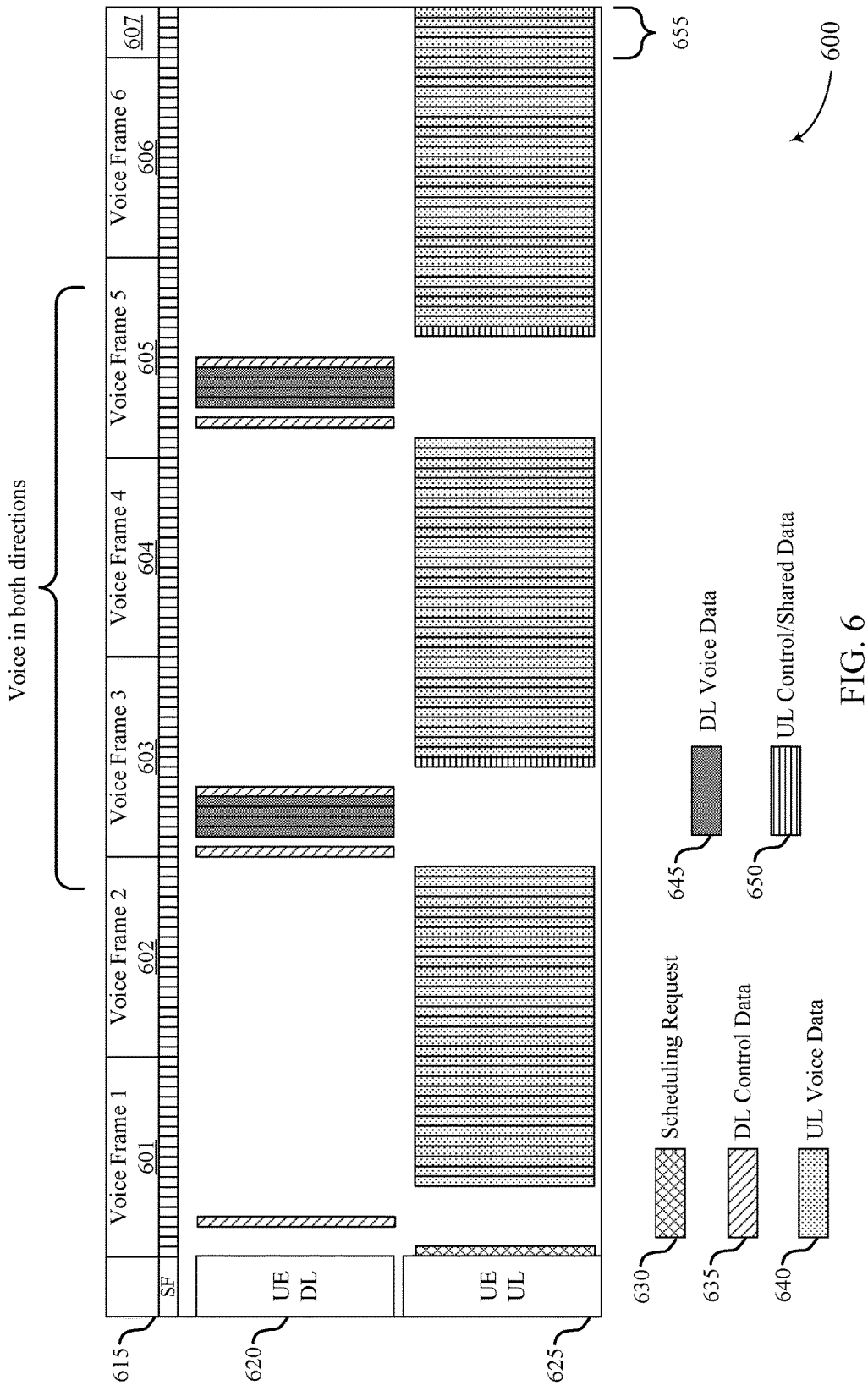
FIG. 6 illustrates an example of an unmodified talk frame time delay budget where talk-over is present, in accordance with aspects of the present disclosure.

However, in the event that a SID packet may be transmitted, the timelines for the IP flow may be negatively impacted. An illustration of such a situation is provided in FIG. 6, which illustrates an example of another time delay budget 600, in which a talk-over situation is present. The time delay budget 600 in this example may utilize a first CE level employed within the systems 100 or 200 of FIG. 1 or 2 for voice data packets. In this example, a first 20 ms voice frame 601, a second 20 ms voice frame 602, a third 20 ms voice frame 603, a fourth 20 ms voice frame 604, a fifth 20 ms voice frame 605, a sixth 20 ms voice frame 606, and a portion of a seventh 20 ms voice frame 607, are illustrated.

In this example, uplink talk data may be transmitted by a UE, and downlink talk data may be received at the UE, without any modifications to the IP flow. Data may be transmitted in subframes 615 associated with each voice frame 601-607, which may include half-duplex UE downlink transmissions 620 and UE uplink transmissions 625. In this example, the UE (e.g., a UE 115 of FIGS. 1-3) may transmit bundled voice packets, and transmit a scheduling request (SR) 630 to the base station. The UE may receive downlink control data 635 that may include an uplink grant for transmission of the voice data. After a cross subframe scheduling delay, uplink voice data 640 transmissions may be transmitted. Following an initial transmission of uplink voice data 640, which may be completed in the second voice frame 602, downlink control data 635 may be received that indicates downlink voice data 645 is to be transmitted, followed by the downlink voice data 645 and a downlink control data 635 transmission that may provide a second uplink grant.

The UE may transmit uplink control (and possible shared data) in transmission 650, followed by a second transmission of uplink voice data 640 that may span the third voice frame 603, the fourth voice frame 604, and part of the fifth voice frame 605. Thus, a delay in the RTP IP flow timeline is introduced. In the event that further downlink voice data 645 is to be transmitted, due to the talk-over situation, a third uplink voice data 640 transmission is not started until late in the fifth voice frame 605, which is not completed until the seventh voice frame 607 with a scheduling delay 655. Thus, scheduling delay further builds up, which may impact a call quality of the IP flow. If such a situation continued, subsequent voice frames will have a delay in the order of (2N+1 (MOD(N,2))ms, and this delay will accumulate, where N is the number of 40 ms time bundles from the time the talk-over started. Thus, for a talk-over situation having a one-second duration, a 51 ms scheduling delay will accumulate, according to this example.

Figure 7:
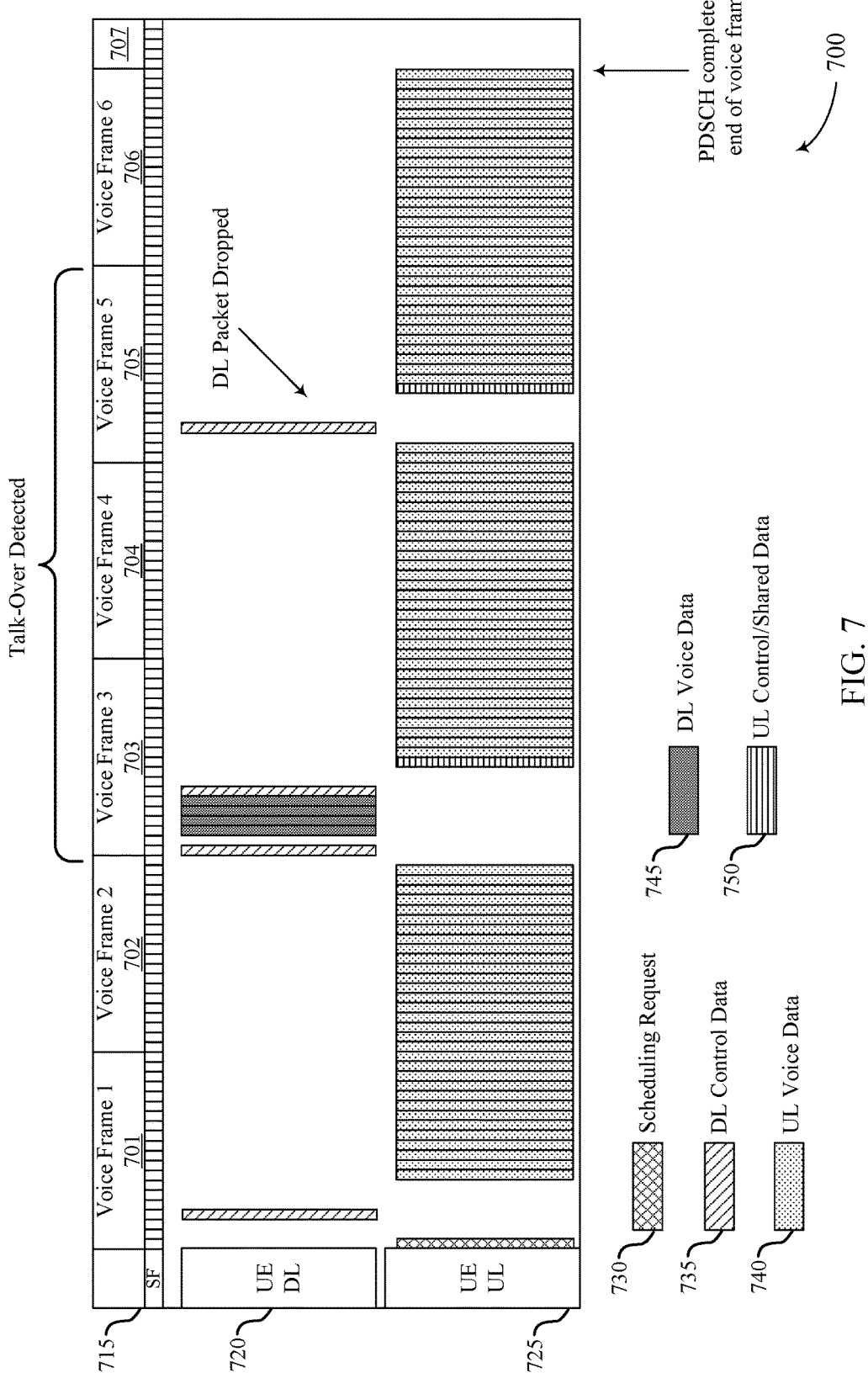
FIG. 7 illustrates an example of a modified talk frame delay budget where talk-over is present that supports IP flow management for capacity-limited wireless devices in accordance with aspects of the present disclosure.

FIG. 7 illustrates an example of a time delay budget 700 for IP flow management for capacity-limited wireless devices. The time delay budget 700 in this example may utilize modification of an IP flow, and may be employed within the systems 100 or 200 of FIG. 1 or 2 for voice data transmissions in the event of a talk-over situation. In this example, a first 20 ms voice frame 701, a second 20 ms voice frame 702, a third 20 ms voice frame 703, a fourth 20 ms voice frame 704, a fifth 20 ms voice frame 705, a sixth 20 ms voice frame 706, and a portion of a seventh 20 ms voice frame 707, are illustrated.

In this example, uplink talk data may be transmitted by a UE, and downlink talk data may be received at the UE. Data may be transmitted in subframes 715 associated with each voice frame 701-707, which may include half-duplex UE downlink transmissions 720 and UE uplink transmissions 725. In this example, the UE (e.g., a UE 115 of FIGS. 1-3) may transmit bundled voice packets, and transmit a SR 730 to the base station. The UE may receive downlink control data 735 that may include an uplink grant for transmission of the voice data. After a cross subframe scheduling delay, uplink voice data 740 transmissions may be transmitted. Following an initial transmission of uplink voice data 740, which may be completed in the second voice frame 702, downlink control data 735 may be received that indicates downlink voice data 745 is to be transmitted, followed by the downlink voice data 745 and a downlink control data 735 transmission that may provide a second uplink grant.

The UE may transmit uplink control (and possible shared data) in transmission 750, followed by a second transmission of uplink voice data 740 that may span the third voice frame 703, the fourth voice frame 704, and part of the fifth voice frame 705. Thus, a delay in the RTP IP flow timeline is introduced. In this example, the talk-over pattern is detected, and the scheduling delay is detected, and a downlink packet may be dropped in the fifth voice frame 705. A third uplink voice data 740 transmission may be started in the fifth voice frame 705 which may be completed at the end of the sixth voice frame 706, and thus the IP flow timelines are maintained. Subsequent voice frames may meet timelines and the process may be repeated in the event that further talk-over is detected.

As discussed above, in some examples one or more uplink transmissions may be dropped, such as by being dropped by the UE upon detection of a talk-over pattern, or dropped through suppression of an uplink transmission following the termination of an SPS grant. In such examples, the IP flow timelines may be maintained more easily in the event that the UE is using a coverage enhancement level having a relatively high number of repetitions. In some examples, as indicated above, the modification of the IP flow may include modifying a CE level of the uplink transmissions, downlink transmissions, or both. For example, in the example of FIG. 7 a bundling level may be reduced from eight to four for one or more uplink voice data 740 transmissions, thus allowing uplink voice data 740 transmissions to be completed in 16 subframes rather than 32 subframes.

Figure 8:
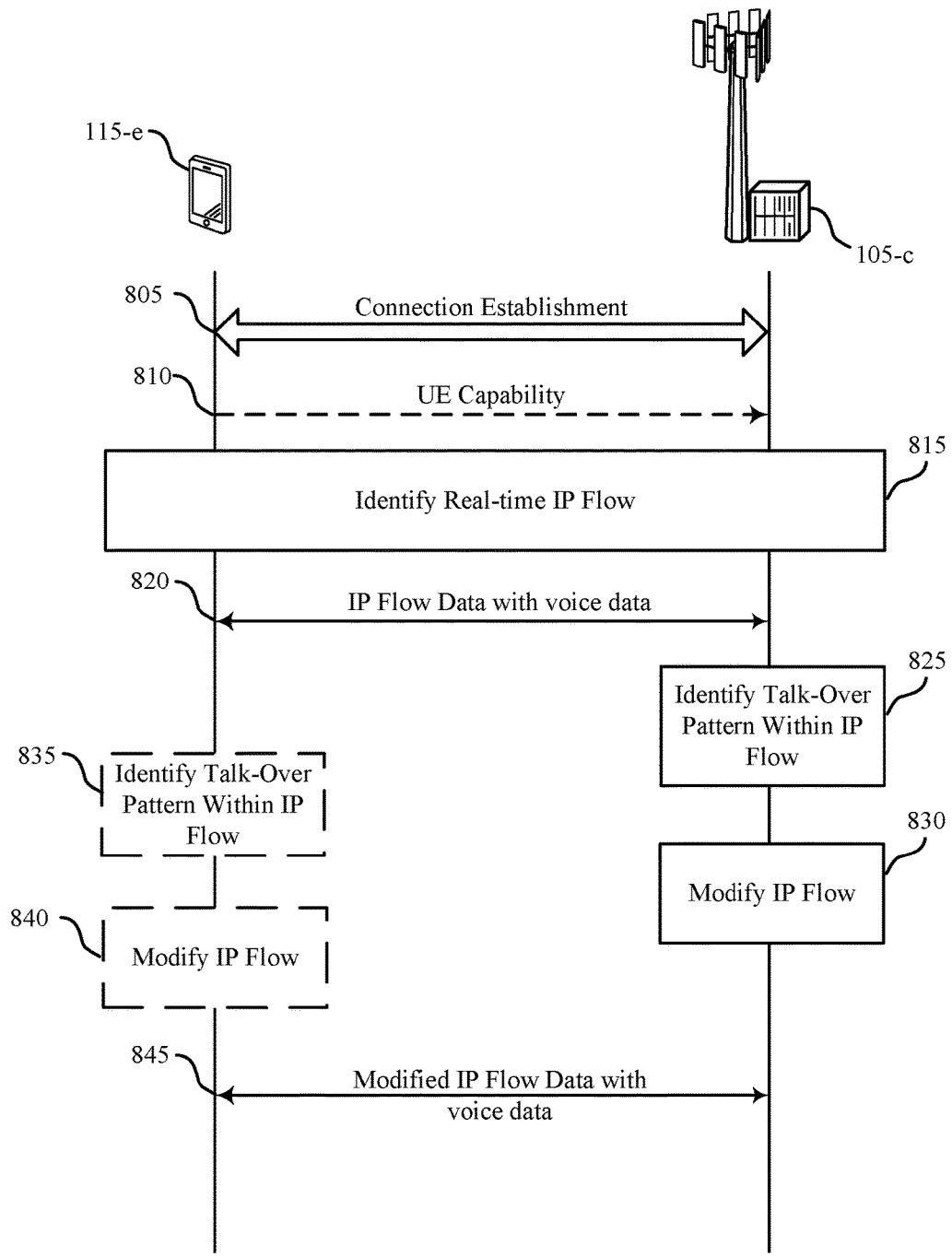
FIG. 8 illustrates an example of a process flow that supports IP flow management for capacity-limited wireless devices in accordance with aspects of the present disclosure.

FIG. 8 illustrates an example of a process flow 800 for IP flow management for capacity-limited wireless devices. The process flow 800 may illustrate aspects of talk-over identification and IP flow modification employed within the systems 100 or 200 of FIG. 1 or 2. The process flow 800 includes a UE 115-e and a base station 105-c, which may be examples of a UE 115 and base station 105 of FIGS. 1-3. The UE 115-e may be a CAT-M1 device or may have a channel quality metric that is below a threshold value, and thus the UE 115-e and the base station 105-c may employ CE techniques. The UE 115-e and base station 105-c may establish a connection 805. Optionally, UE 115-e may transmit a UE capability indication 810, which may be in response to a UE capability inquiry received from the base station 105-c, which may indicate, for example, a capability of the UE 115-e to identify talk-over and autonomously drop certain transmissions or drop transmissions in response to a suspended SPS grant.

At block 815, the base station 105-c and UE 115-e may identify a real-time IP flow, such as a VoLTE IP flow, and initiate the IP flow 820 between the base station 105-c and the UE 115-e. Such a real-time IP flow may be identified, for example, based on a request received from the UE 115-e to initiate a real-time data service, such as a voice call.

At block 825, the base station 105-c may identify a talk-over pattern within the IP flow. In some examples, the UE 115-e may also identify a talk-over pattern within the IP flow at optional block 835. For example, the base station 105-c or UE 115-e may identify talk-over based on parameters associated with the IP flow. For example, the determination of talk-over may be based at least in part on packet sizes in both directions on the RTP IP flow, a QCI of the RTP IP flow, an APN, an IP address, or an IP subnet associated with the RTP IP flow. In some cases, the determination of talk-over may be based at least in part on one or more of: separate DSCP values associated with the RTP IP flow; DPI-based detection of RTP speech; the presence of packets in both directions having a frequency that is greater than a frequency of delivery of SID packets; or a build-up of a data queue associated with the RTP flow.

The base station, at block 830, may modify the IP flow based on the identified talk-over pattern. Likewise, in cases where the UE 115-e is capable, it may modify the IP flow at optional block 840. In cases where one or more packets are dropped, the packets to be dropped may be identified based on, for example, a random selection, a first packet in a queue to be delivered, a packet that is identified by a special DSCP, or a packet having a packet size that is larger than other packets or that exceeds a threshold value. In such a manner, timelines associated with a modified IP flow 845 may be maintained with relatively little impact on the quality of the call. Following the talk-over situation, or following the easing of a congestion situation, the non-modified IP flow 820 may be resumed, and the process repeated as necessary.

Figure 9:
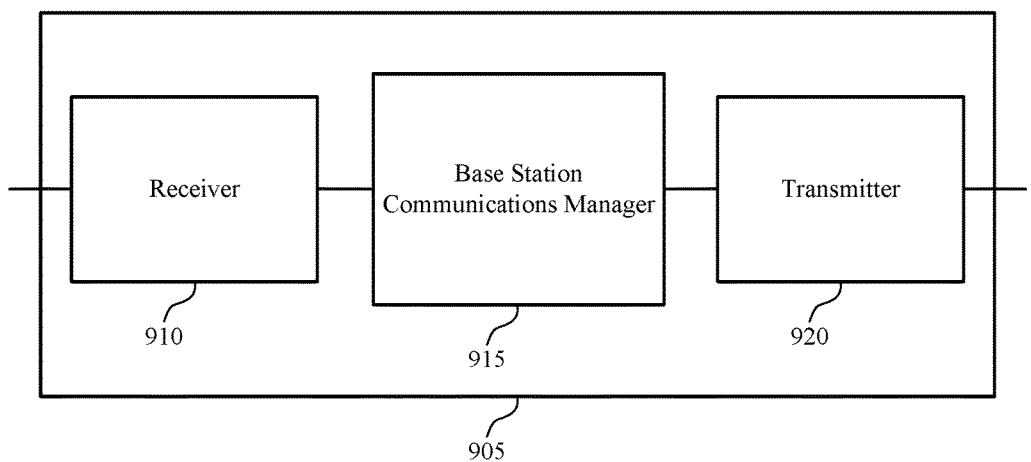
FIGS. 9 through 11 show diagrams of a device that supports IP flow management for capacity-limited wireless devices in accordance with aspects of the present disclosure.

FIG. 9 shows a diagram 900 of a wireless device 905 that supports IP flow management for capacity-limited wireless devices in accordance with various aspects of the present disclosure. Wireless device 905 may be an example of aspects of a base station 105 as described with reference to FIGS. 1-3. Wireless device 905 may include receiver 910, base station communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to IP flow management for capacity-limited wireless devices, etc.). Information may be passed on to other components of the device. The receiver 910 may be an example of aspects of the transceiver 1235 described with reference to FIG. 12.

Base station communications manager 915 may be an example of aspects of the base station communications manager 1215 described with reference to FIG. 12. Base station communications manager 915 may identify an IP flow containing real-time voice data to be transmitted to a UE, identify a talk-over pattern within the IP flow, and modify the IP flow based on the identified talk-over pattern within the IP flow.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
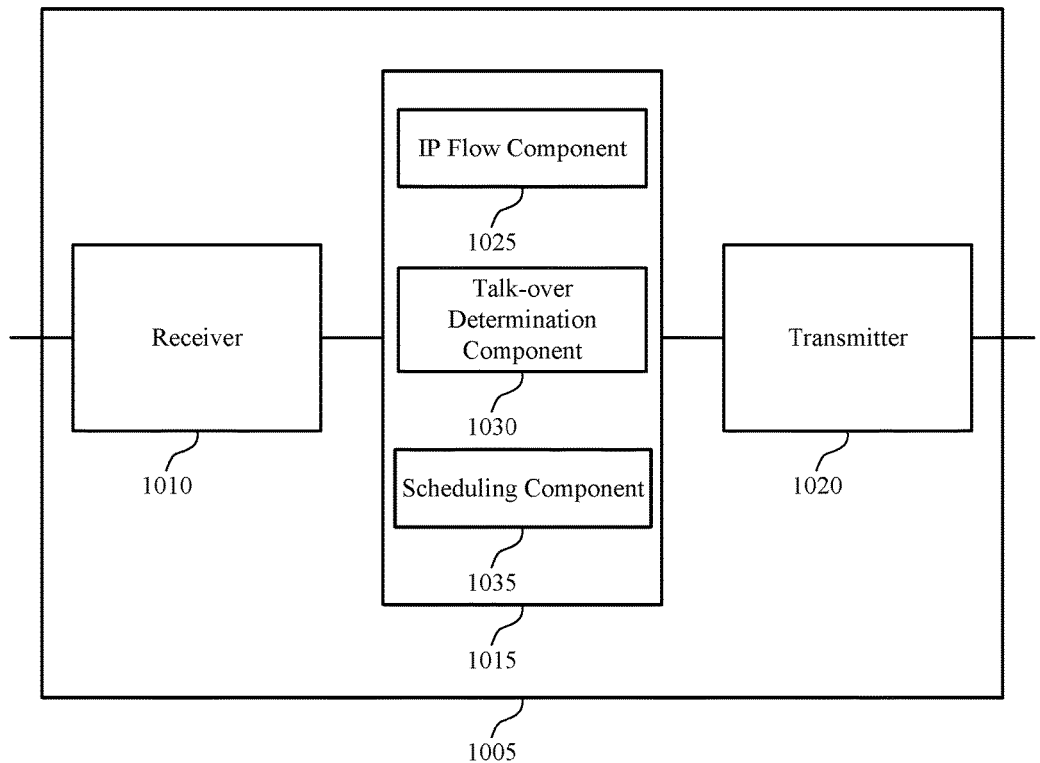

FIG. 10 shows a diagram 1000 of a wireless device 1005 that supports IP flow management for capacity-limited wireless devices in accordance with various aspects of the present disclosure. Wireless device 1005 may be an example of aspects of a wireless device 905 or a base station 105 as described with reference to FIGS. 1-3 and 9. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to IP flow management for capacity-limited wireless devices, etc.). Information may be passed on to other components of the device. The receiver 1010 may be an example of aspects of the transceiver 1235 described with reference to FIG. 12.

Base station communications manager 1015 may be an example of aspects of the base station communications manager 1215 described with reference to FIG. 12. Base station communications manager 1015 may also include IP flow component 1025, talk-over determination component 1030, and scheduling component 1035.

IP flow component 1025 may identify an internet protocol (IP) flow containing real-time voice data to be transmitted to a UE. In some cases, the identifying the talk-over pattern within the IP flow includes identifying a RTP IP flow associated with the UE.

Talk-over determination component 1030 may identify a talk-over pattern within the IP flow and determine that voice data is included in both uplink packets transmitted from the UE and downlink packets to be transmitted to the UE.

Scheduling component 1035 may modify the IP flow based on the identified talk-over pattern within the IP flow. In some examples, the scheduling component 1035 may determine that the voice data exceeds a link capacity of the UE (e.g., based on a number of downlink packets queued to be transmitted to the UE that may exceed a threshold value), and based on the determination, or based on a talk-over indication, drop the one or more identified packets from the IP flow. In some cases, one or more downlink packets or uplink packets may be dropped. In some cases, the scheduling component 1035 may terminate a SPS grant to the UE when one or more uplink packets are to be dropped. In some cases, the UE may suppress one or more uplink packets to be transmitted from the UE when the SPS grant is terminated. In some cases, the IP flow may be resumed by signaling, after one or more downlink transmissions to the UE, a resumed SPS grant to the UE. In some cases, the IP flow may be modified by dropping a downlink packet or a set of bundled RTP packets that are scheduled in one set of transmissions to the UE. In some cases, the modifying the IP flow includes determining whether to drop one or more uplink or downlink packets from the IP flow. In some cases, the scheduling component 1035 may determine whether to drop the one or more uplink or downlink packets from the IP flow based on one or more of: an amount of uplink data to be transmitted by the UE, a random selection, a first packet in a queue to be delivered, a packet that is identified by a special DSCP, or a packet having a packet size that is larger than other packets or that exceeds a threshold value.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
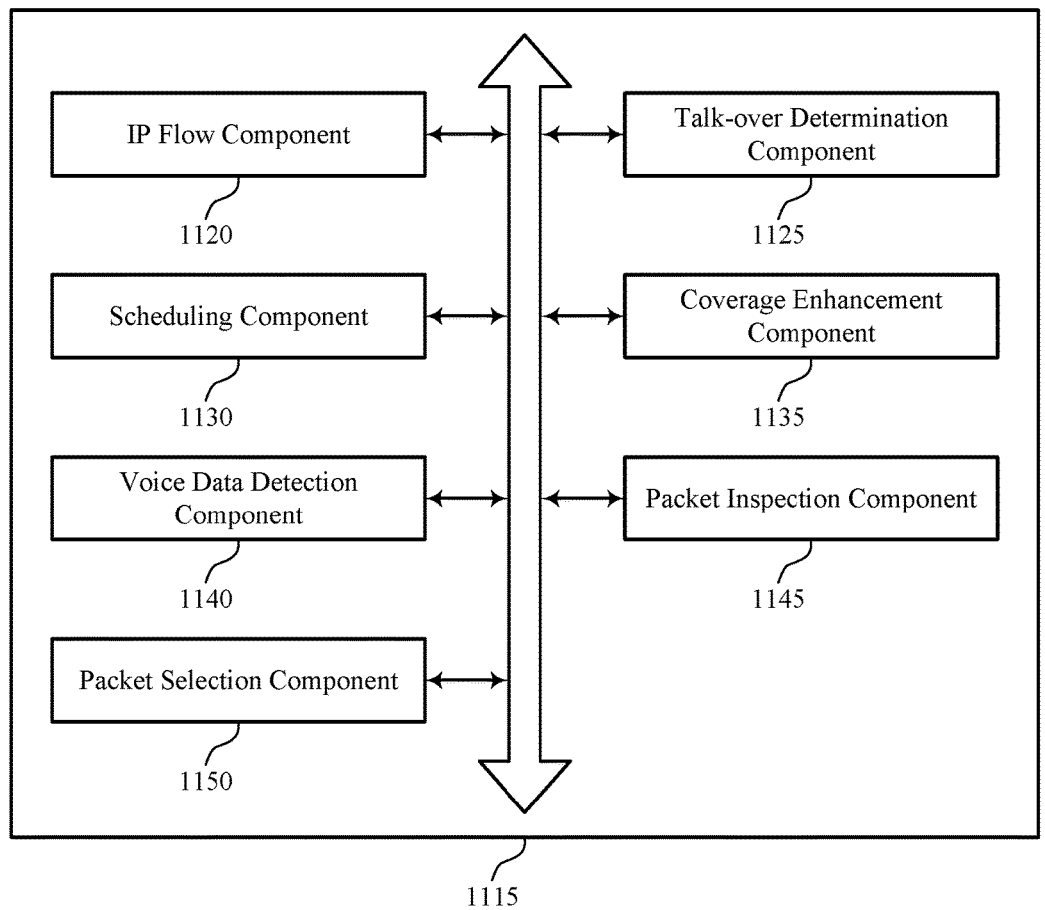

FIG. 11 shows a diagram 1100 of a base station communications manager 1115 that supports IP flow management for capacity-limited wireless devices in accordance with various aspects of the present disclosure. The base station communications manager 1115 may be an example of aspects of a base station communications manager 915, a base station communications manager 1015, or a base station communications manager 1215 described with reference to FIGS. 9, 10, and 12. The base station communications manager 1115 may include IP flow component 1120, talk-over determination component 1125, scheduling component 1130, coverage enhancement component 1135, voice data detection component 1140, packet inspection component 1145, and packet selection component 1150. Each of these modules may communicate, directly or indirectly, with one another (e.g., via one or more buses).

IP flow component 1120 may identify an IP flow containing real-time voice data to be transmitted to a UE. In some cases, the IP flow includes a RTP IP flow associated with the UE.

Talk-over determination component 1125 may identify a talk-over pattern within the IP flow and determine that voice data is included in both uplink packets transmitted from the UE and downlink packets to be transmitted to the UE. In some cases, talk-over determination component 1125 may identify talk-over based on parameters associated with the IP flow. For example, the determination of talk-over may be based at least in part on packet sizes in both directions on the RTP IP flow, a QCI of the RTP IP flow, an APN, an IP address, or an IP subnet associated with the RTP IP flow. In some cases, the determination of talk-over may be based at least in part on one or more of: separate DSCP values associated with the RTP IP flow; DPI-based detection of RTP speech; the presence of packets in both directions having a frequency that is greater than a frequency of delivery of SID packets; or a build-up of a data queue associated with the RTP flow.

Scheduling component 1130 may modify the IP flow based on the identified talk-over pattern within the IP flow. Scheduling component 1130 may, for example, drop the one or more identified packets from the IP flow, drop one or more downlink packets and an associated downlink transmission to the UE when one or more downlink packets are to be dropped, or terminate a SPS grant to the UE when one or more uplink packets are to be dropped.

Coverage enhancement component 1135 may be used to establish a CE level associated with the IP flow. In some cases, the modifying the IP flow includes modifying a reliability target, and an associated CE level, for one or more packets to be transmitted in the IP flow. In some cases, the reliability target indicates one or more of a repetition rate for the one or more packets or a quantity of HARQ retransmissions associated with the one or more packets.

Voice data detection component 1140 may determine that voice data is included in both uplink packets transmitted from the UE and downlink packets to be transmitted to the UE, and thus that a talk-over pattern is present. In some cases, the determination includes identifying the voice data based on one or more of a packet size of one or more packets of the RTP IP flow, a QCI of the RTP IP flow, an APN, an IP address, or an IP subnet associated with the RTP IP flow. In some cases, the determining that voice data is included in both uplink packets transmitted from the UE and downlink packets to be transmitted to the UE includes identifying separate DSCP values associated with the RTP IP flow. In some cases, the determining that voice data is included in both uplink packets transmitted from the UE and downlink packets to be transmitted to the UE includes determining that a frequency of the uplink packets and downlink packets exceeds a SID packet frequency.

Packet inspection component 1145 may perform a DPI of the uplink packets and the downlink packets to identify voice data, in some examples. Packet selection component 1150 may identify one or more packets to be dropped from the IP flow, which may be based on one or more of: a random selection of packets within the IP flow, a first packet in a queue associated with the IP flow that is to be delivered to the UE, a DSCP value of packets within the IP flow, a packet size of packets within the IP flow, or any combination thereof.

Figure 12:
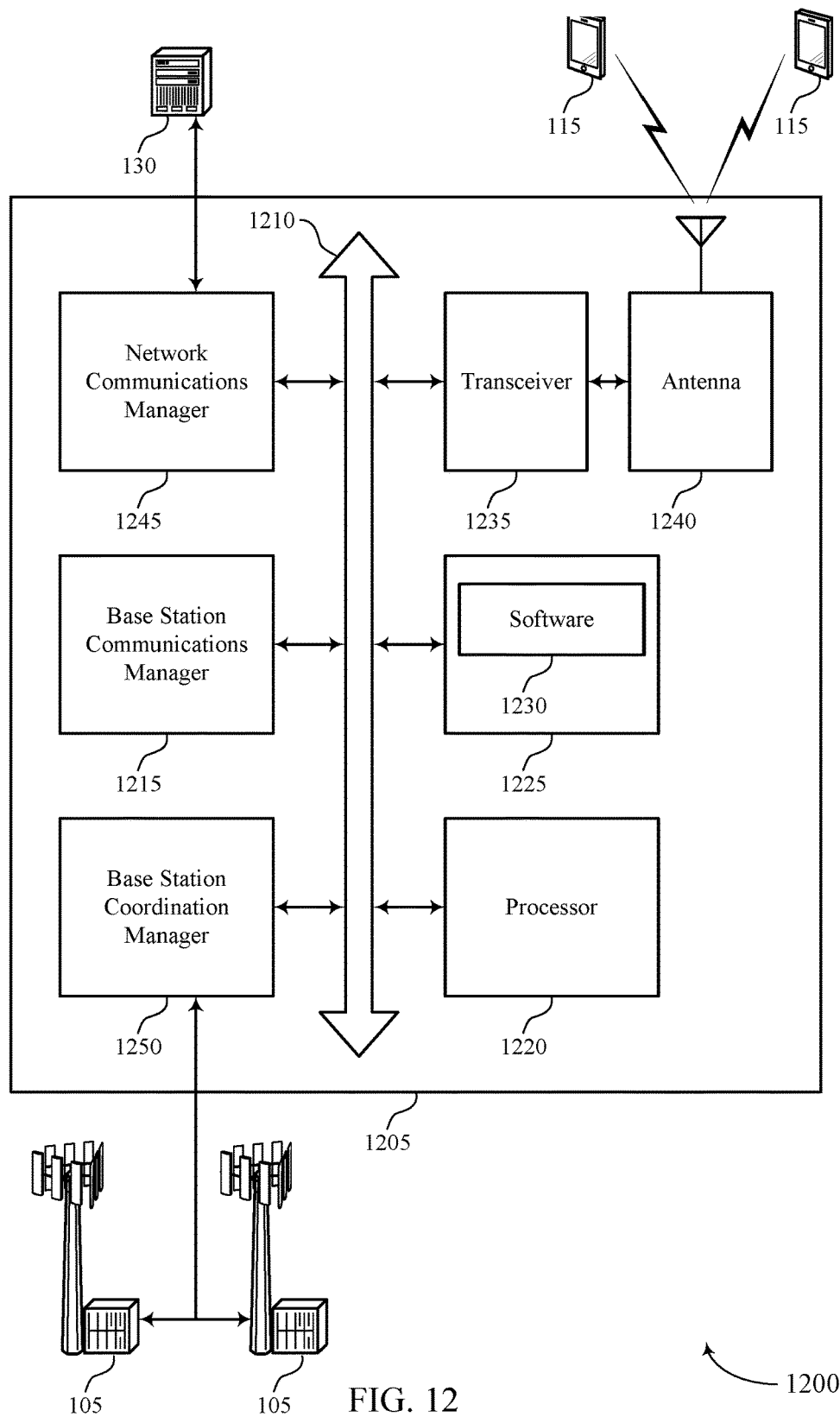
FIG. 12 illustrates a diagram of a system including a base station that supports IP flow management for capacity-limited wireless devices in accordance with aspects of the present disclosure.

FIG. 12 shows a diagram of a system 1200 including a device 1205 that supports IP flow management for capacity-limited wireless devices in accordance with various aspects of the present disclosure. Device 1205 may be an example of or include the components of wireless device 905, wireless device 1005, or a base station 105 as described above, e.g., with reference to FIGS. 1, 9 and 10. Device 1205 may include components for bi-directional voice and data communications including components for transmitting and receiving communications, including base station communications manager 1215, processor 1220, memory 1225, software 1230, transceiver 1235, antenna 1240, network communications manager 1245, and base station coordination manager 1250. These components may be in electronic communication via one or more busses (e.g., bus 1210). Device 1205 may communicate wirelessly with one or more UEs 115.

Base station coordination manager 1250 may manage communications with other base station 105, and may include a controller or scheduler for controlling communications with UEs 115 in cooperation with other base stations 105. For example, the base station coordination manager 1250 may coordinate scheduling for transmissions to UEs 115 for various interference mitigation techniques such as beamforming or joint transmission. In some examples, base station coordination manager 1250 may provide an X2 interface within an LTE/LTE-A wireless communication network to provide communication between base stations 105.

Processor 1220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting IP flow management for capacity-limited wireless devices).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support IP flow management for capacity-limited wireless devices. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1215 may manage communications with one or more UEs 115 and support IP flow management for capacity-limited wireless devices as described herein.

Figure 13:
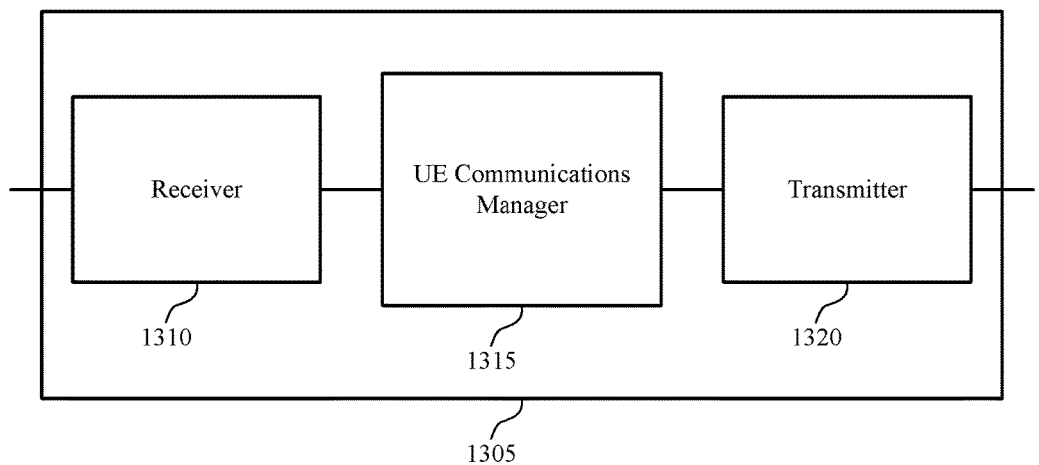
FIGS. 13 through 15 show diagrams of a device that supports IP flow management for capacity-limited wireless devices in accordance with aspects of the present disclosure.

FIG. 13 shows a diagram 1300 of a wireless device 1305 that supports IP flow management for capacity-limited wireless devices in accordance with various aspects of the present disclosure. Wireless device 1305 may be an example of aspects of a UE 115 as described with reference to FIG. 1. Wireless device 1305 may include receiver 1310, UE communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to IP flow management for capacity-limited wireless devices, etc.). Information may be passed on to other components of the device. The receiver 1310 may be an example of aspects of the transceiver 1635 described with reference to FIG. 16.

UE communications manager 1315 may be an example of aspects of the UE communications manager 1615 described with reference to FIG. 16. UE communications manager 1315 may identify an IP flow containing real-time voice data to be transmitted to a base station, identify a talk-over pattern within the IP flow, and modify the IP flow based on the identified talk-over pattern within the IP flow.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
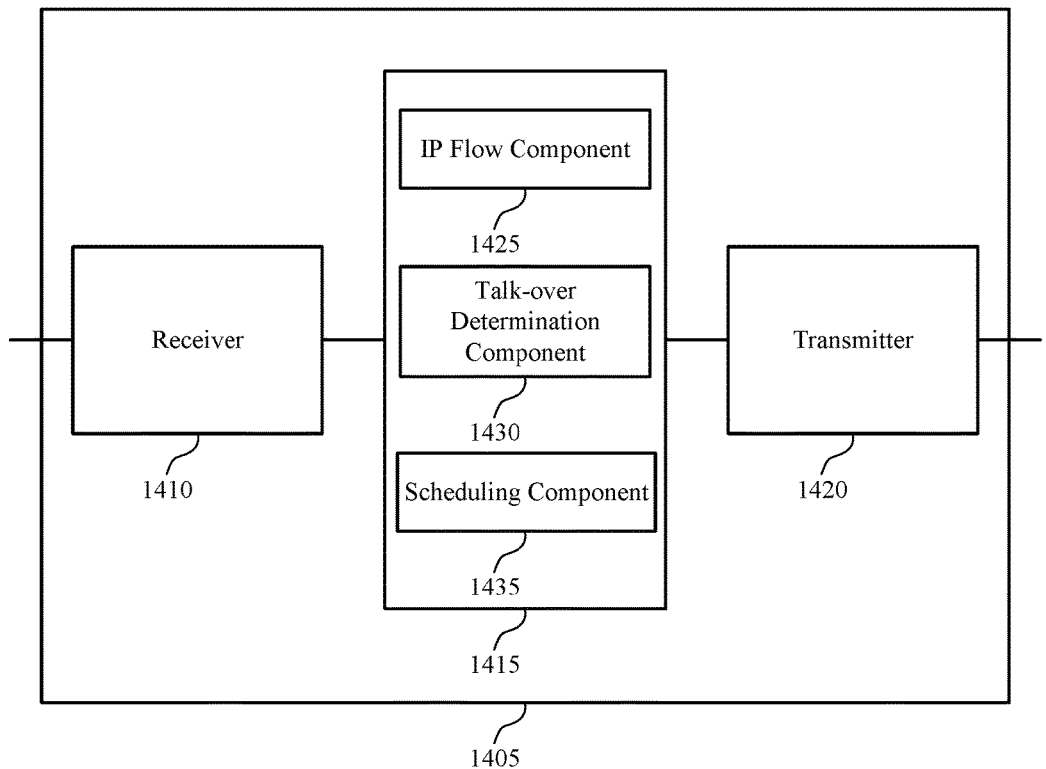

FIG. 14 shows a diagram 1400 of a wireless device 1405 that supports IP flow management for capacity-limited wireless devices in accordance with various aspects of the present disclosure. Wireless device 1405 may be an example of aspects of a wireless device 1305 or a UE 115 as described with reference to FIGS. 1 and 13. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to IP flow management for capacity-limited wireless devices, etc.). Information may be passed on to other components of the device. The receiver 1410 may be an example of aspects of the transceiver 1635 described with reference to FIG. 16.

UE communications manager 1415 may be an example of aspects of the UE communications manager 1615 described with reference to FIG. 16. UE communications manager 1415 may also include IP flow component 1425, talk-over determination component 1430, and scheduling component 1435.

IP flow component 1425 may identify, at a UE, an IP flow containing real-time voice data to be transmitted to a base station. Talk-over determination component 1430 may identify a talk-over pattern within the IP flow and determine that the voice data exceeds a link capacity of the UE. In some cases, the identifying the talk-over pattern within the IP flow includes determining that the IP flow includes voice data in both uplink packets to be transmitted from the UE and in downlink packets being received at the UE.

Scheduling component 1435 may modify the IP flow based on the identified talk-over pattern within the IP flow and drop the one or more identified packets from the IP flow. In some cases, the modifying the IP flow includes dropping one or more uplink packets from the IP flow based on the identified talk-over pattern within the IP flow. In some cases, the modifying the IP flow includes modifying a reliability target for one or more packets to be transmitted in the IP flow. In some cases, the determining that the voice data exceeds the link capacity of the UE includes determining that a queue size associate with the IP flow exceeds a threshold value. In some cases, the determining that the voice data exceeds the link capacity of the UE includes determining that a SPS grant to the UE has been terminated while the UE still has voice data to be transmitted. In some cases, the modifying the IP flow further includes discontinuing the modifying based on determining, after one or more downlink transmissions to the UE, that the SPS grant to the UE is reinstated. In some cases, the dropping the one or more uplink packets from the IP flow includes identifying one or more packets to be dropped from the IP flow.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
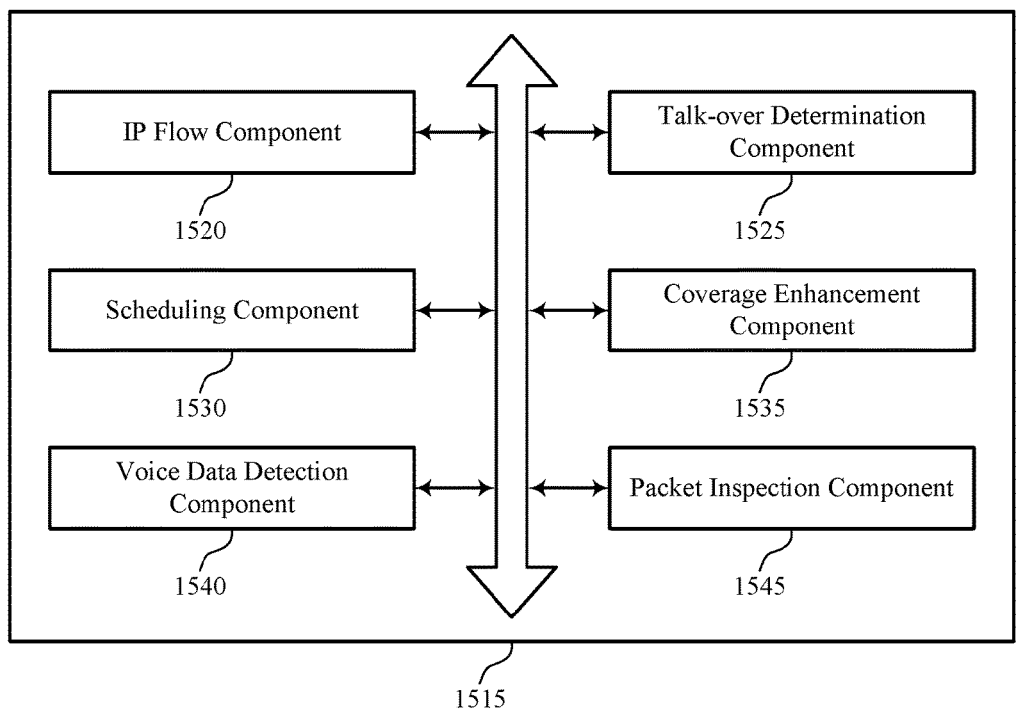

FIG. 15 shows a diagram 1500 of a UE communications manager 1515 that supports IP flow management for capacity-limited wireless devices in accordance with various aspects of the present disclosure. The UE communications manager 1515 may be an example of aspects of a UE communications manager 1615 described with reference to FIGS. 13, 14, and 16. The UE communications manager 1515 may include IP flow component 1520, talk-over determination component 1525, scheduling component 1530, coverage enhancement component 1535, voice data detection component 1540, and packet inspection component 1545. Each of these modules may communicate, directly or indirectly, with one another (e.g., via one or more buses).

IP flow component 1520 may identify an IP flow containing real-time voice data to be transmitted to a base station. Talk-over determination component 1525 may identify a talk-over pattern within the IP flow and determine that the voice data exceeds a link capacity of the UE. In some cases, the identifying the talk-over pattern within the IP flow includes determining that the IP flow includes voice data in both uplink packets to be transmitted from the UE and in downlink packets being received at the UE.

Scheduling component 1530 may modify the IP flow based on the identified talk-over pattern within the IP flow and drop the one or more identified packets from the IP flow. In some cases, the modifying the IP flow includes dropping one or more uplink packets from the IP flow based on the identified talk-over pattern within the IP flow. In some cases, the modifying the IP flow includes modifying a reliability target for one or more packets to be transmitted in the IP flow. In some cases, the determining that the voice data exceeds the link capacity of the UE includes determining that a queue size associate with the IP flow exceeds a threshold value. In some cases, the determining that the voice data exceeds the link capacity of the UE includes determining that a SPS grant to the UE has been terminated while the UE still has voice data to be transmitted. In some cases, the modifying the IP flow further includes discontinuing the modifying based on determining, after one or more downlink transmissions to the UE, that the SPS grant to the UE is reinstated. In some cases, the dropping the one or more uplink packets from the IP flow includes identifying one or more packets to be dropped from the IP flow.

Coverage enhancement component 1535 may identify a CE level based on a reliability target that indicates one or more of a repetition rate for the one or more packets or a quantity of HARQ retransmissions associated with the one or more packets.

Voice data detection component 1540 may identify the voice data based on one or more of a packet size of one or more of packets of the IP flow, a QCI of the IP flow, an APN, an IP address, or an IP subnet associated with the IP flow. In some cases, the determining that the IP flow includes voice data in both uplink packets and downlink packets includes identifying separate DSCP values associated with the IP flow. In some cases, the determining that the IP flow includes voice data in both uplink packets and downlink packets includes determining that a frequency of the downlink packets exceeds a SID packet frequency. Packet inspection component 1545 may, in some cases, perform a DPI of the uplink packets and the downlink packets to identify voice data.

Figure 16:
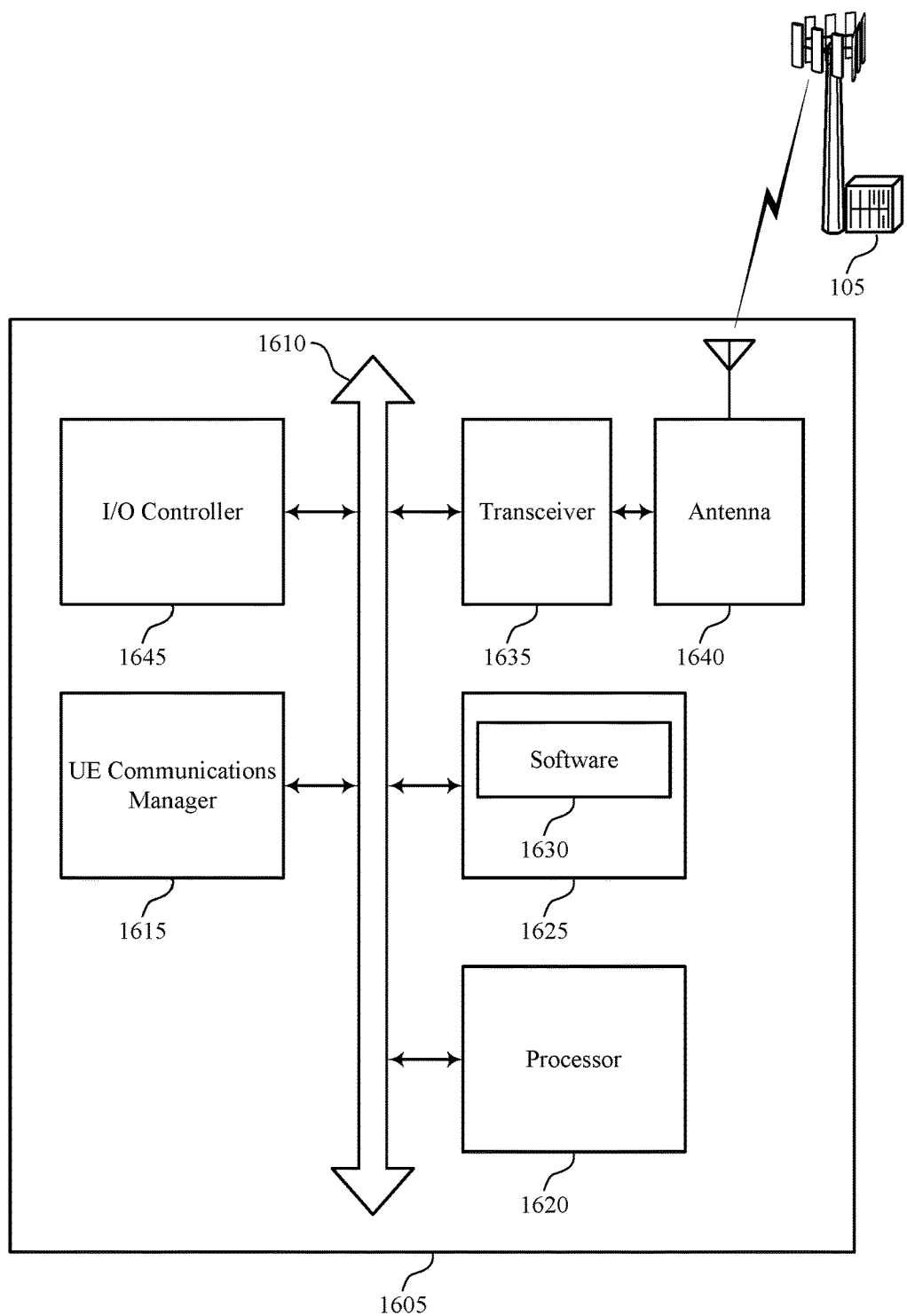
FIG. 16 illustrates a diagram of a system including a UE that supports IP flow management for capacity-limited wireless devices in accordance with aspects of the present disclosure.

FIG. 16 shows a diagram of a system 1600 including a device 1605 that supports IP flow management for capacity-limited wireless devices in accordance with various aspects of the present disclosure. Device 1605 may be an example of or include the components of UE 115 as described above, e.g., with reference to FIG. 1. Device 1605 may include components for bi-directional voice and data communications including components for transmitting and receiving communications, including UE communications manager 1615, processor 1620, memory 1625, software 1630, transceiver 1635, antenna 1640, and I/O controller 1645. These components may be in electronic communication via one or more busses (e.g., bus 1610). Device 1605 may communicate wirelessly with one or more base stations 105. UE communications manager 1615 may manage communications with one or more base stations 105 and support IP flow management for capacity-limited wireless devices as described herein.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting IP flow management for capacity-limited wireless devices).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support IP flow management for capacity-limited wireless devices. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

I/O controller 1645 may manage input and output signals for device 1605. I/O controller 1645 may also manage peripherals not integrated into device 1605. In some cases, I/O controller 1645 may represent a physical connection or port to an external peripheral. In some cases, I/O controller 1645 may utilize an operating system such as iOS®, ANDROID®, MS-DOS®, MS-WINDOWS®, OS/2®, UNIX®, LINUX®, or another known operating system.

Figure 17:
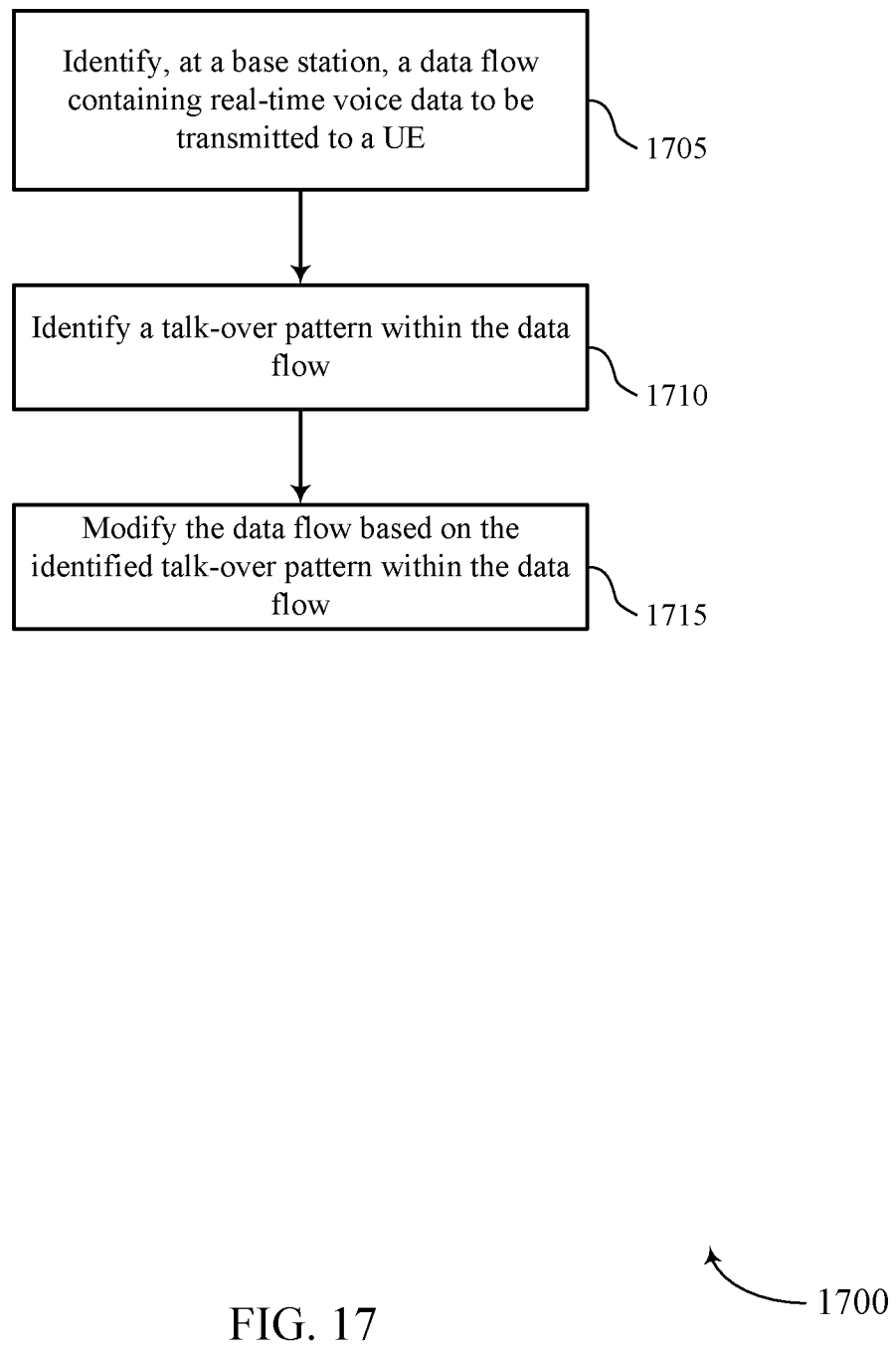
FIGS. 17 through 21 illustrate methods for IP flow management for capacity-limited wireless devices in accordance with aspects of the present disclosure.

FIG. 17 shows a flowchart illustrating a method 1700 for IP flow management for capacity-limited wireless devices in accordance with various aspects of the present disclosure. The operations of method 1700 may be implemented by a base station 105 or its components as described herein. For example, the operations of method 1700 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1705 the base station 105 may identify, at a base station, a data flow containing real-time voice data to be transmitted to a UE. The operations of block 1705 may be performed according to the methods described with reference to FIGS. 1 through 8. In certain examples, aspects of the operations of block 1705 may be performed by a IP flow component as described with reference to FIGS. 9 through 12.

At block 1710 the base station 105 may identify a talk-over pattern within the data flow. The operations of block 1710 may be performed according to the methods described with reference to FIGS. 1 through 8. In certain examples, aspects of the operations of block 1710 may be performed by a talk-over determination component as described with reference to FIGS. 9 through 12.

At block 1715 the base station 105 may modify the data flow based at least in part on the identified talk-over pattern within the data flow. The operations of block 1715 may be performed according to the methods described with reference to FIGS. 1 through 8. In certain examples, aspects of the operations of block 1715 may be performed by a scheduling component as described with reference to FIGS. 9 through 12.

In some examples, the modifying the data flow comprises dropping one or more downlink packets to be transmitted to the UE. In some examples, modifying the data flow may include terminating a SPS grant to the UE to suppress one or more uplink packets to be transmitted from the UE. In further examples, modifying the data flow may include modifying a reliability target for one or more packets to be transmitted in the data flow.

Figure 18:
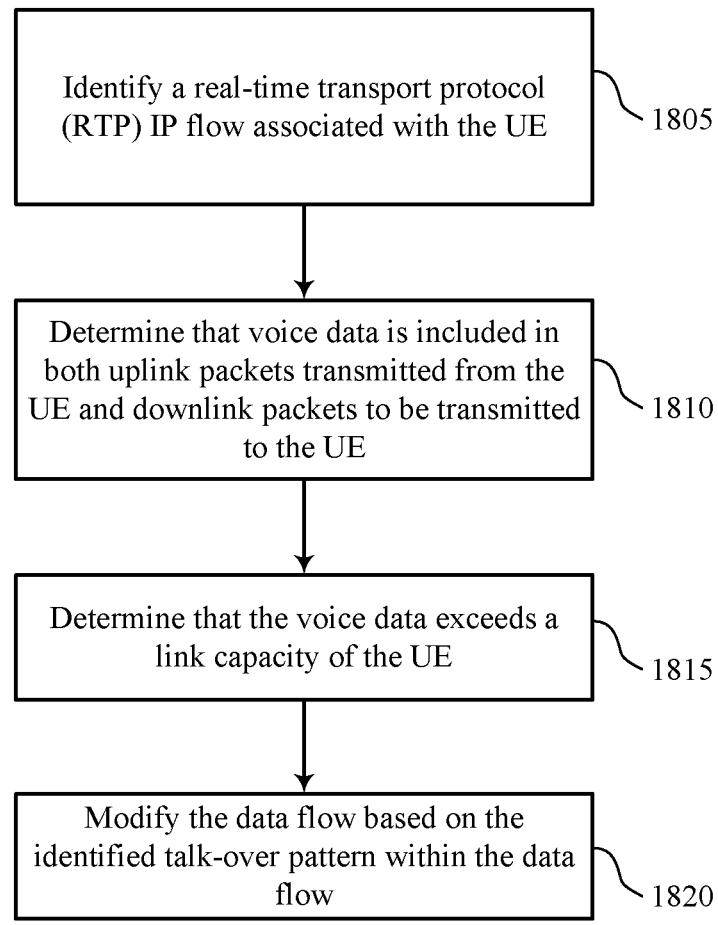

FIG. 18 shows a flowchart illustrating a method 1800 for IP flow management for capacity-limited wireless devices in accordance with various aspects of the present disclosure. The operations of method 1800 may be implemented by a base station 105 or its components as described herein. For example, the operations of method 1800 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify, at a base station, a data flow containing real-time voice data to be transmitted to a UE. The operations of block 1805 may be performed according to the methods described with reference to FIGS. 1 through 8. In certain examples, aspects of the operations of block 1805 may be performed by a IP flow component as described with reference to FIGS. 9 through 12.

At block 1810 the base station 105 may determine that voice data is included in both uplink packets transmitted from the UE and downlink packets to be transmitted to the UE. The operations of block 1810 may be performed according to the methods described with reference to FIGS. 1 through 8. In certain examples, aspects of the operations of block 1810 may be performed by a talk-over determination component as described with reference to FIGS. 9 through 12.

At block 1815 the base station 105 may determine that the voice data exceeds a link capacity of the UE. The operations of block 1815 may be performed according to the methods described with reference to FIGS. 1 through 8. In certain examples, aspects of the operations of block 1815 may be performed by a scheduling component as described with reference to FIGS. 9 through 12.

At block 1820 the base station 105 may modify the data flow based at least in part on the identified talk-over pattern within the data flow. The operations of block 1820 may be performed according to the methods described with reference to FIGS. 1 through 8. In certain examples, aspects of the operations of block 1820 may be performed by a scheduling component as described with reference to FIGS. 9 through 12.

Figure 19:
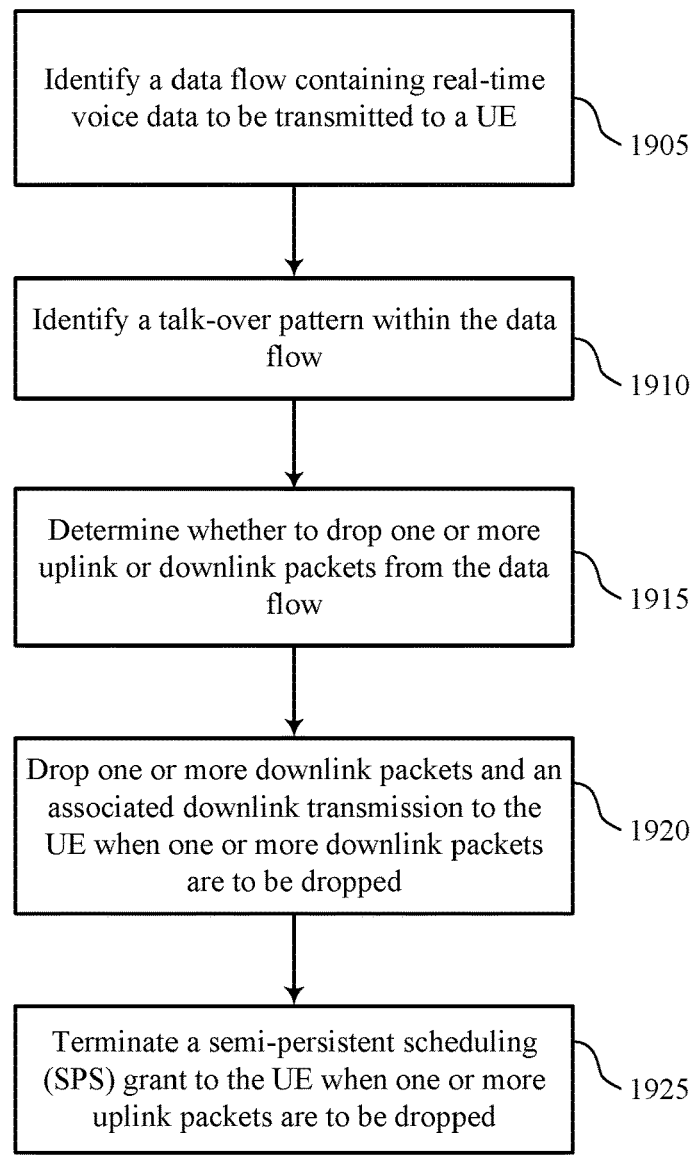

FIG. 19 shows a flowchart illustrating a method 1900 for IP flow management for capacity-limited wireless devices in accordance with various aspects of the present disclosure. The operations of method 1900 may be implemented by a base station 105 or its components as described herein. For example, the operations of method 1900 may be performed by a base station communications manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may identify a data flow containing real-time voice data to be transmitted to a UE. The operations of block 1905 may be performed according to the methods described with reference to FIGS. 1 through 8. In certain examples, aspects of the operations of block 1905 may be performed by a IP flow component as described with reference to FIGS. 9 through 12.

At block 1910 the base station 105 may identify a talk-over pattern within the data flow. The operations of block 1910 may be performed according to the methods described with reference to FIGS. 1 through 8. In certain examples, aspects of the operations of block 1910 may be performed by a talk-over determination component as described with reference to FIGS. 9 through 12.

At block 1915 the base station 105 may determine whether to drop one or more uplink or downlink packets from the data flow. The operations of block 1915 may be performed according to the methods described with reference to FIGS. 1 through 8. In certain examples, aspects of the operations of block 1915 may be performed by a scheduling component as described with reference to FIGS. 9 through 12.

At block 1920 the base station 105 may drop one or more downlink packets and an associated downlink transmission to the UE when one or more downlink packets are to be dropped. The operations of block 1920 may be performed according to the methods described with reference to FIGS. 1 through 8. In certain examples, aspects of the operations of block 1920 may be performed by a scheduling component as described with reference to FIGS. 9 through 12.

At block 1925 the base station 105 may terminate a SPS grant to the UE when one or more uplink packets are to be dropped. The operations of block 1925 may be performed according to the methods described with reference to FIGS. 1 through 8. In certain examples, aspects of the operations of block 1925 may be performed by a scheduling component as described with reference to FIGS. 9 through 12.

Figure 20:
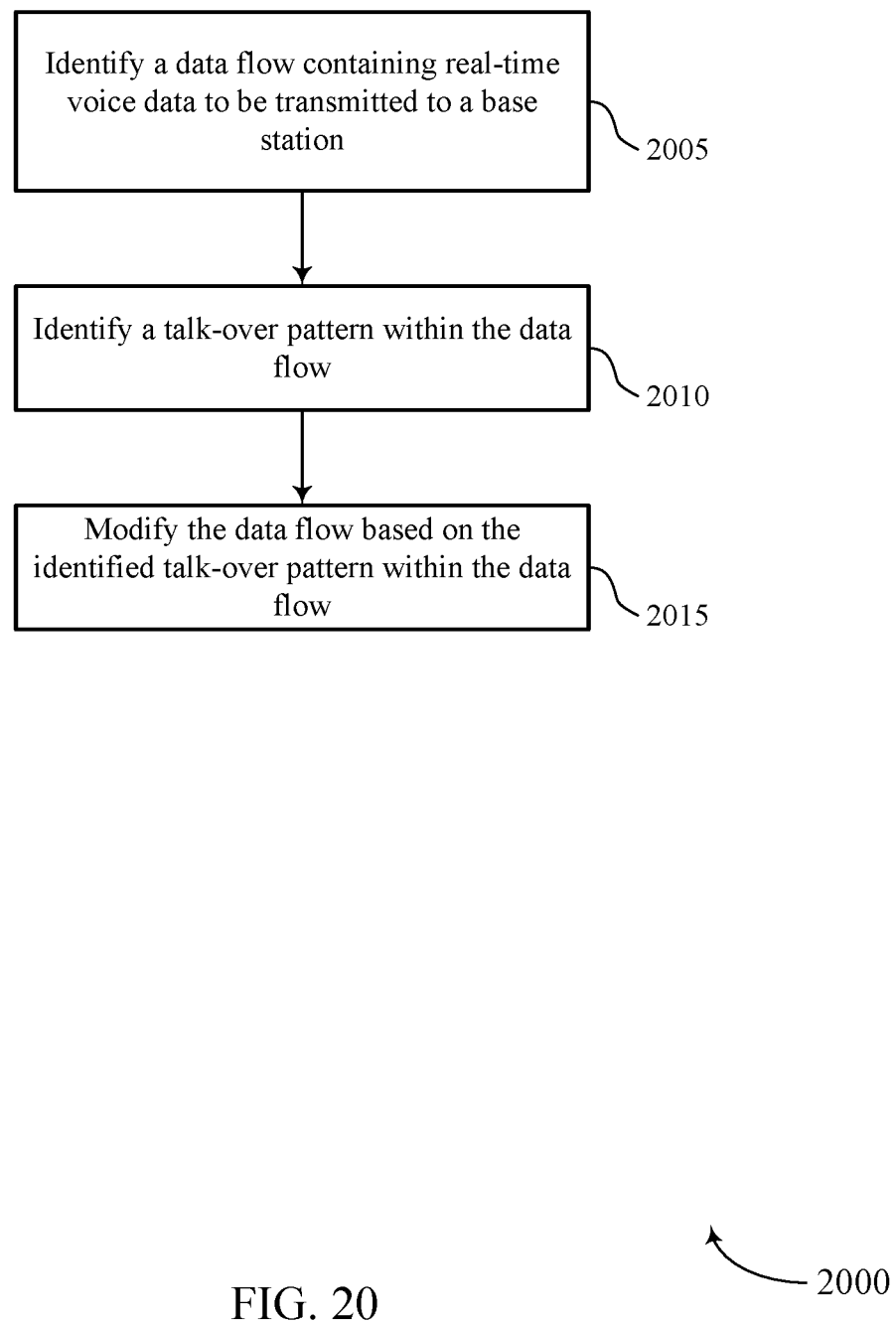

FIG. 20 shows a flowchart illustrating a method 2000 for IP flow management for capacity-limited wireless devices in accordance with various aspects of the present disclosure. The operations of method 2000 may be implemented by a UE 115 or its components as described herein. For example, the operations of method 2000 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may identify a data flow containing real-time voice data to be transmitted to a base station. The operations of block 2005 may be performed according to the methods described with reference to FIGS. 1 through 8. In certain examples, aspects of the operations of block 2005 may be performed by a IP flow component as described with reference to FIGS. 13 through 16.

At block 2010 the UE 115 may identify a talk-over pattern within the data flow. The operations of block 2010 may be performed according to the methods described with reference to FIGS. 1 through 8. In certain examples, aspects of the operations of block 2010 may be performed by a talk-over determination component as described with reference to FIGS. 13 through 16.

At block 2015 the UE 115 may modify the data flow based at least in part on the identified talk-over pattern within the data flow. The operations of block 2015 may be performed according to the methods described with reference to FIGS. 1 through 8. In certain examples, aspects of the operations of block 2015 may be performed by a scheduling component as described with reference to FIGS. 13 through 16.

In some examples, the modifying the data flow comprises dropping one or more uplink packets from the data flow based at least in part on the identified talk-over pattern within the data flow. In other examples, the modifying the data flow comprises modifying a reliability target for one or more packets to be transmitted in the data flow.

Figure 21:
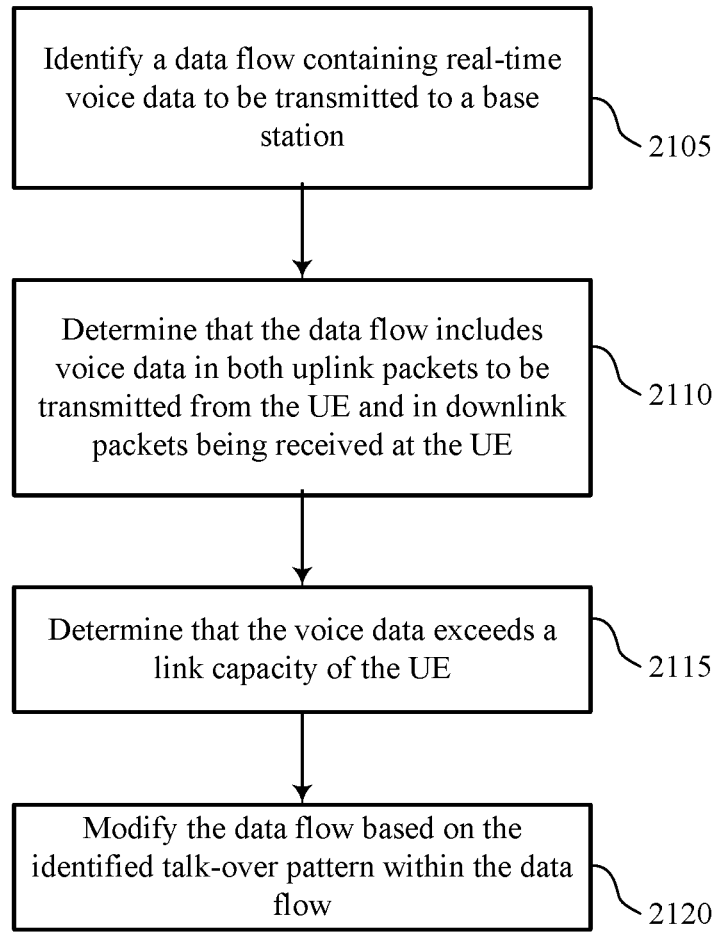

FIG. 21 shows a flowchart illustrating a method 2100 for IP flow management for capacity-limited wireless devices in accordance with various aspects of the present disclosure. The operations of method 2100 may be implemented by a UE 115 or its components as described herein. For example, the operations of method 2100 may be performed by a UE communications manager as described with reference to FIGS. 13 through 16. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may identify a data flow containing real-time voice data to be transmitted to a base station. The operations of block 2105 may be performed according to the methods described with reference to FIGS. 1 through 8. In certain examples, aspects of the operations of block 2105 may be performed by a IP flow component as described with reference to FIGS. 13 through 16.

At block 2110 the UE 115 may determine that the data flow includes voice data in both uplink packets to be transmitted from the UE and in downlink packets being received at the UE. The operations of block 2110 may be performed according to the methods described with reference to FIGS. 1 through 8. In certain examples, aspects of the operations of block 2110 may be performed by a talk-over determination component as described with reference to FIGS. 13 through 16.

At block 2115 the UE 115 may determine that the voice data exceeds a link capacity of the UE. The operations of block 2115 may be performed according to the methods described with reference to FIGS. 1 through 8. In certain examples, aspects of the operations of block 2115 may be performed by a talk-over determination component as described with reference to FIGS. 13 through 16.

At block 2120 the UE 115 may modify the data flow based at least in part on the identified talk-over pattern within the data flow. The operations of block 2120 may be performed according to the methods described with reference to FIGS. 1 through 8. In certain examples, aspects of the operations of block 2120 may be performed by a scheduling component as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive or inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying, at a user equipment (UE), a data flow containing real-time voice data to be transmitted to a base station;
    identifying, at the UE, a talk-over pattern within the data flow; and
    modifying, at the UE, the data flow to be transmitted to the base station based at least in part on the identified talk-over pattern within the data flow.

2. The method of claim 1, wherein the modifying the data flow comprises:
    dropping one or more uplink packets from the data flow to be transmitted to the base station based at least in part on the identified talk-over pattern within the data flow.

3. The method of claim 1, wherein the modifying the data flow comprises:
    modifying a reliability target for one or more packets to be transmitted to the base station in the data flow.

4. The method of claim 3, wherein the reliability target indicates one or more of a repetition rate for the one or more packets or a quantity of retransmissions associated with the one or more packets.

5. The method of claim 1, wherein the identifying the talk-over pattern within the data flow comprises:
    determining that the data flow includes voice data in both uplink packets to be transmitted from the UE and in downlink packets being received at the UE; and
    determining that the voice data exceeds a link capacity of the UE.

6. The method of claim 5, wherein the determining that the data flow includes voice data in both uplink packets and downlink packets comprises:
    identifying the voice data based at least in part on one or more of a packet size of one or more of packets of the data flow, a quality-of-service class identifier (QCI) of the data flow, an access point name (APN), an IP address, or an IP subnet associated with the data flow.

7. The method of claim 5, wherein the determining that the data flow includes voice data in both uplink packets and downlink packets comprises:
    identifying separate differentiated services code point (DSCP) values associated with the data flow.

8. The method of claim 5, wherein the determining that the data flow includes voice data in both uplink packets and downlink packets comprises:
    performing a deep packet inspection (DPI) of the uplink packets and the downlink packets.

9. The method of claim 5, wherein the determining that the data flow includes voice data in both uplink packets and downlink packets comprises:
    determining that a frequency of the downlink packets exceeds a silence indicator description (SID) packet frequency.

10. The method of claim 5, wherein the determining that the voice data exceeds the link capacity of the UE comprises:
    determining that a queue size associated with the data flow exceeds a threshold value.

11. The method of claim 5, wherein the determining that the voice data exceeds the link capacity of the UE comprises:
    determining that a semi-persistent scheduling (SPS) grant to the UE has been terminated while the UE still has voice data to be transmitted.

12. The method of claim 11, wherein the modifying the data flow further comprises:
    discontinuing the modifying based at least in part on determining, after one or more downlink transmissions to the UE, that the SPS grant to the UE is reinstated.

13. The method of claim 1, wherein modifying the data flow comprises:
    identifying one or more packets to be dropped from the data flow, wherein the identifying one or more packets to be dropped from the data flow is based at least in part on one or more of:
    a random selection of packets within the data flow;
    a first packet in a queue associated with the data flow that is to be delivered to the UE;
    a differentiated services code print (DSCP) value of packets within the data flow;
    or a packet size of packets within the data glow; and
    dropping the one or more identified packets from the data flow.

14. The method of claim 1, wherein modifying the data flow comprises:
    identifying the talk-over pattern within the data flow falls below a threshold; and
    transmitting, to the base station, a request to reinstate a SPS grant.

15. A method for wireless communication, comprising:
    identifying, at a base station, a data flow containing real-time voice data to be transmitted to a user equipment (UE);
    identifying, at the base station, a talk-over pattern within the data flow, wherein the identifying the talk-over pattern within the data flow comprises:
    identifying a real-time transport protocol (RTP) IP flow associated with the UE;
    determining that voice data is included in both uplink packets transmitted from the UE and downlink packets to be transmitted to the UE; and
    determining that the voice data exceeds a link capacity of the UE; and
    modifying, at the base station, the data flow to be transmitted to the UE based at least in part on the identified talk-over pattern within the data flow.

16. The method of claim 15, wherein the modifying the data flow comprises:
    dropping one or more downlink packets, or a set of bundled real-time transport protocol (RTP) packets that are scheduled in one set of transmissions to the UE.

17. The method of claim 15, wherein the modifying the data flow comprises:
terminating a semi-persistent scheduling (SPS) grant to the UE to suppress one or more uplink packets to be transmitted from the UE.

18. The method of claim 17, wherein the modifying the data flow further comprises:
signaling, after one or more downlink transmissions to the UE, a resumed SPS grant to the UE.

19. The method of claim 15, wherein the modifying the data flow comprises:
modifying a reliability target for one or more packets to be transmitted in the data flow.

20. The method of claim 19, wherein the reliability target indicates one or more of a repetition rate for the one or more packets or a quantity of retransmissions associated with the one or more packets.

21. The method of claim 15, wherein the determining that voice data is included in both uplink packets transmitted from the UE and downlink packets to be transmitted to the UE comprises:
identifying the voice data based at least in part on one or more of a packet size of one or more packets of the RTP IP flow, a quality-of-service class identifier (QCI) of the RTP IP flow, an access point name (APN), an IP address, or an IP subnet associated with the RTP IP flow; identifying separate differentiated services code point (DSCP) values associated with the RTP IP flow; performing a deep packet inspection (DPI) of the uplink packets and the downlink packets; or a combination thereof.

22. The method of claim 15, wherein the determining that voice data is included in both uplink packets transmitted from the UE and downlink packets to be transmitted to the UE comprises:
determining that a frequency of the uplink packets and downlink packets exceeds a silence indicator description (SID) packet frequency.

23. The method of claim 15, wherein the determining that the voice data exceeds the link capacity of the UE comprises:
determining that a queue size associate with the RTP IP flow exceeds a threshold value.

24. The method of claim 15, wherein modifying the data flow comprises:
identifying one or more packets to be dropped from the data flow, wherein the identifying one or more packets to be dropped from the data flow is based at least in part on one or more of:
a random selection of packets within the data flow;
a first packet in a queue associated with the data flow that is to be delivered to the UE;
a differentiated services code point (DSCP) value of packets within the data flow; or
a packet size of packets within the data flow; and
dropping one or more identified packets from the data flow.

25. The method of claim 15, wherein the modifying the data flow comprises:
determining whether to drop one or more uplink or downlink packets from the data flow;
dropping one or more downlink packets and an associated downlink transmission to the UE when one or more downlink packets are to be dropped; and
terminating a semi-persistent scheduling (SPS) grant to the UE when one or more uplink packets are to be dropped.

26. The method of claim 15, wherein the determining whether to drop the one or more uplink or downlink packets from the data flow is based at least in part on one or more of:
an amount of uplink data to be transmitted by the UE;
a number of downlink packets queued to be transmitted to the UE;
or a repetition level associated with the uplink data.

27. The method of claim 15, wherein modifying the data flow comprises:
identifying the talk-over pattern within the data flow falls below a threshold; and
reinstating a SPS grant to the UE, based at least in part on the identifying.

28. An apparatus for wireless communication, in a system comprising:
a processor;
memory coupled to the processor; and
instructions stored in the memory and operable, when executed by the processor, to cause the apparatus to:
identify, at a user equipment (UE), an internet protocol (IP) flow containing real-time voice data to be transmitted to a base station;
identify, at the UE, a talk-over pattern within the data flow; and
modify, at the UE, the data flow to be transmitted to the base station based at least in part on the identified talk-over pattern within the data flow.

29. An apparatus for wireless communication, in a system comprising:
a processor;
memory coupled to the processor; and
instructions stored in the memory and operable, when executed by the processor, to cause the apparatus to:
identify, at a base station, a data flow containing real-time voice data to be transmitted to a user equipment (UE);
identify, at the base station, a talk-over pattern within the data flow, wherein the identifying the talk-over pattern within the data flow comprises:
identifying a real-time transport protocol (RTP) IP flow associated with the UE;
determining that voice data is included in both uplink packets transmitted from the UE and downlink packets to be transmitted to the UE; and
determining that the voice data exceeds a link capacity of the UE; and
modify, at the base station, the data flow to be transmitted to the UE based at least in part on the identified talk-over pattern within the data flow.

* * * * *